United States Patent
Miller et al.

(10) Patent No.: US 11,818,159 B2
(45) Date of Patent: Nov. 14, 2023

(54) WEBSITE GUEST RISK ASSESSMENT AND MITIGATION

(71) Applicant: Target Brands, Inc., Minneapolis, MN (US)

(72) Inventors: Troy T. Miller, Minneapolis, MN (US); Erik Thoreson, Minneapolis, MN (US); Matt Clark, Minneapolis, MN (US); Nidhi Agarwal, Minneapolis, MN (US); Rachit Singhal, Minneapolis, MN (US); Suhas Chakravarthi, Minneapolis, MN (US); Vinod Joseph, Minneapolis, MN (US); Abhayjeet Singh, Minneapolis, MN (US); Timothy James Hruska, Maple Grove, MN (US); Evan Gaustad, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 376 days.

(21) Appl. No.: 17/118,444

(22) Filed: Dec. 10, 2020

(65) Prior Publication Data

US 2021/0185076 A1  Jun. 17, 2021

Related U.S. Application Data

(60) Provisional application No. 62/946,766, filed on Dec. 11, 2019.

(51) Int. Cl.
*G06N 5/04* (2023.01)
*H04L 9/40* (2022.01)

(52) U.S. Cl.
CPC .......... *H04L 63/1433* (2013.01); *G06N 5/04* (2013.01)

(58) Field of Classification Search
CPC .............................. H04L 63/1433; G06N 5/04
USPC ............................................................ 726/25
See application file for complete search history.

(56) References Cited

U.S. PATENT DOCUMENTS

| | | | |
|---|---|---|---|
| 6,691,232 B1 | 2/2004 | Wood et al. | |
| 7,216,361 B1 * | 5/2007 | Roskind | G06F 21/41 726/8 |
| 9,870,465 B1 * | 1/2018 | Levi | H04L 67/306 |
| 10,079,836 B2 | 9/2018 | Klein et al. | |
| 10,462,173 B1 * | 10/2019 | Aziz | G06F 21/566 |
| 10,594,721 B1 * | 3/2020 | Scotney | H04L 63/1433 |
| 10,872,341 B1 * | 12/2020 | Beckman | H04L 63/1425 |

(Continued)

*Primary Examiner* — Thanh T Le
(74) *Attorney, Agent, or Firm* — Barnes & Thornburg LLP

(57) ABSTRACT

Techniques are provided for assessing and determining risks that are posed by various users to a website. The determined risk for each user can be used to modify the user experience of the website in a manner that is commensurate with the risk (or non-risk) posed by the user. Assessment of risks posed a website guest can be performed by collecting guest-related data from a plurality of different service engines, aggregating contextual information from the guest-related data, and calculating a risk score based on the contextual information. The risk score can represent the internal reputation of the guest using the guest device. The risk score can be transmitted to a remote computing device and used to modify content of the website according to the risk score. Further, a recommended action can be determined based on the risk score, which can be taken by a backend service for the website guest.

18 Claims, 15 Drawing Sheets

(56) References Cited

U.S. PATENT DOCUMENTS

| | | | |
|---|---|---|---|
| 11,558,412 B1* | 1/2023 | Drake | G06F 16/26 |
| 2004/0215980 A1 | 10/2004 | Hamid | |
| 2005/0097320 A1* | 5/2005 | Golan | G06Q 20/4014 |
| | | | 713/166 |
| 2007/0118887 A1 | 5/2007 | Roskind | |
| 2009/0025084 A1* | 1/2009 | Siourthas | G06Q 20/405 |
| | | | 726/25 |
| 2014/0283061 A1* | 9/2014 | Quinlan | H04L 63/1408 |
| | | | 726/23 |
| 2015/0264067 A1* | 9/2015 | Kim | H04L 63/20 |
| | | | 726/23 |
| 2016/0080408 A1* | 3/2016 | Coleman | G06F 21/577 |
| | | | 726/22 |
| 2017/0187709 A1* | 6/2017 | Rotem | H04L 63/0861 |
| 2017/0214679 A1* | 7/2017 | Lin | H04L 63/083 |
| 2017/0346824 A1* | 11/2017 | Mahabir | H04L 63/1433 |
| 2018/0041488 A1* | 2/2018 | Kohli | H04L 63/20 |
| 2018/0152471 A1* | 5/2018 | Jakobsson | H04L 63/1425 |
| 2018/0375877 A1* | 12/2018 | Jakobsson | G06F 16/955 |
| 2019/0199745 A1* | 6/2019 | Jakobsson | H04L 63/1483 |
| 2020/0082108 A1* | 3/2020 | Griffin | H04L 63/0876 |
| 2020/0162489 A1* | 5/2020 | Bar-Nahum | G06N 20/00 |
| 2020/0201981 A1* | 6/2020 | Wardman | G06F 21/44 |
| 2020/0382546 A1* | 12/2020 | Henderson | H04L 63/1433 |
| 2020/0396239 A1* | 12/2020 | Kaidi | H04L 63/1416 |
| 2020/0412717 A1* | 12/2020 | Puertas Calvo | H04L 63/1433 |
| 2021/0105289 A1* | 4/2021 | Desai | H04L 63/1416 |
| 2021/0158348 A1* | 5/2021 | Wardman | H04W 4/24 |

* cited by examiner

| IP | ASN | Country | Risk Level (rules) | Event Date | Transactions this week | Enabled |
|---|---|---|---|---|---|---|
| 178.10.158.1 | Comcast | US | Extreme ▶ | 9/1/2019 | 325 | ☐ |
| * | GoDaddy | US | Medium ▶ | 9/1/2019 | 102,857 | ☑ |
| * | * | Romania | High ▶ | 5/1/2020 | 10,547 | ☐ |
| * | * | Any US | Low ▶ | 8/1/2019 | 1,542,147 | ☑ |

Source IP Address | User Acct/Domain | Device | User Agent | Attribute Wizard

Import (csv/xls) | Delete Multiple

WEBSITE GUEST RISK ASSESSMENT AND MITIGATION

CROSS-REFERENCE TO RELATED APPLICATIONS

This application claims the benefit of U.S. Provisional Application Ser. No. 62/946,766, filed on Dec. 11, 2019. The disclosures of the prior applications are considered part of (and are incorporated by reference in) the disclosure of this application.

TECHNICAL FIELD

This document describes systems and methods related to generating and using website guest risk scores for guests interacting with a website.

BACKGROUND

Websites, such as ecommerce websites, may ask customers to provide their personal identification information, account numbers, and other sensitive information, and may be vulnerable to security threats including hackers, spammers, identity thieves, and others looking to defraud a website (e.g., purchase goods using stolen credit cards). Websites have been developed with security measures in place, such as security logins, user authentication steps, device authentication steps, encryption, and/or others. Website security has been designed to protect a website from falling victim to bad actors seeking to defraud the web site's services, and to also protect its own users/customers from being potentially harmed (e.g., preventing theft of private/sensitive user data, such as financial account information, usernames, passwords, and other sensitive information).

Websites have been increasingly designed with user experience in mind. For example, many websites have been designed to provide a streamlined user experience that meets the needs of the customer without too many hindrances or annoyances, such as additional screens to click through and superfluous information to add. User experience involves a customer's emotions and attitudes about interacting with a website, and varies dynamically, constantly modifying over time due to changing usage circumstances and to changes to individual systems as well as to the context in which they operate. For example, customers may want to freely interact with various webpages and applications without too much interference resulting from one or more different authentication requirements for login, checkout, payment, and other sensitive resources.

SUMMARY

This document is generally directed systems, methods, devices, and techniques for assessing and determining risks that are posed by various users to a website and, depending on the determined risk for each user, modifying the user experience of the website in a manner that is commensurate with the risk (or non-risk) posed by the user. Such risks can be calculated based on data from various data sources that are configurable. The systems, methods, devices, and techniques described herein can provide recommended actions based on the collected data and/or the calculated risk levels. For example, a website user who visits from an IP address that has previously been associated with hacking attempts and who attempts to purchase items that have been more closely associated with fraud (e.g., large number of gift card purchases), may be determined to have a high risk score based on these factors. As a result, the user experience for that user may be adjusted so as to mitigate the potential risk posed by the user, such as requiring that the user successfully complete additional layers authentication before being able to complete the transaction. In another example, a website user who visits the site from a known and verified IP address and who is attempting to perform an action on the website with low associated risk (e.g., visiting informational webpage without sensitive information/actions available) may be assessed a low risk score. As a result, the user experience for this lower risk user may be modified so as to remove potential security barriers/hindrances that may frustrate the user experience. In yet another example, the risk of a website user can be determined by also considering whether the user is a returning user of the website.

This document describes embodiments for improving website security and for providing curated guest experience with a website, such as an online store. The technologies described herein can provide mechanisms for building internal reputation of customers on digital applications. Such internal reputation can be determined by obtaining contextual information of the customers' digital applications and generating risk scores indicating how much potential risk is posed by a website guest (and/or, conversely, safety scores indicating a level of safety/security for a website guest) of the digital applications or devices. Such risk scores can be used to increase guest friction (e.g., stricter authentication requirements) where possible and decrease where needed. Further, the risk scores can be provided to applications to enable applications based safeguards to reduce fraud and theft and prevent data and financial loss.

In addition, internal reputations (e.g., contextual information and/or risk scores) can be used to dynamically customize guest facing content, thereby providing the customers with different user experiences with the website according to the level of potential security threats associated with their interactions. For example, the system can dynamically adjust security levels desirable for such customers, while providing a sufficient level of security on the online store.

Contextual information can be obtained from a variety of sources, which are associated with the guest visiting a website and/or the digital application or device used by the guest. For example, the system can aggregate a variety of facts and insights and produce the contextual information. Such facts and insights can be collected from a variety of sources, such as customer device data (e.g., device fingerprint), network traffic and infrastructure data (e.g., IP address), time/location-related data (e.g., difference in access times, timing of actions, etc.), user behavioral information (e.g., buying habits, types of activities, fraudulent activities, user types (individuals or vendors), login history, etc.), user data (e.g., customer relation data, guest rating, reseller identification, etc.), external reputations, and/or other suitable factors. In some implementations, a predictive model can be used to predict a customer behavioral risk based on his/her past activities.

Contextual information can be used to generate a risk score (or risk level) of the guest or the digital application or device used by the guest. Risk scores can be used to ensure security of the website (e.g., secure checkout process) and to prevent fraud. The contextual information and/or the risk scores can be provided to a security analyst for further analysis and determination of any appropriate action to take with respect to the customer interacting with the website, and/or prevent or remediate any security threat imposed by the customer.

Website content can be modified and even business flows may change, for example, based on the internal reputation (e.g., the contextual information and the risk score), and provide different user experiences of interacting with the website. For example, the system can adjust security levels for access to applications and devices by, for example, elevating or lowering authentication requirements, thereby preventing potentially risky actions from taking place, such as preventing digital transactions from being completed. In some implementations, depending on a risk score, the system can modify a security requirement for the user to access different data/resources in the website. The security requirement can change by elevating or lowering security levels, such as requiring more or less authentication methods. Different levels and/or types of authentication can be determined to match different risk scores. For example, for a lowest risk score (e.g., a highest assurance level/score), anonymous access is permitted without login. A lower risk score (e.g., a higher assurance level/score) can be given to patrons who attempt to perform normal activities like saving items in a cart, and therefore simply uses remembered login credentials to permit such activities without asking for further authentication. In contrast, for a highest risk score (e.g., a lowest assurance level/score), strong credentials are required, such as biometric data, a pin to unlock stored token, push OTP authentication, etc. Infrequent users who attempt to make a large purchase may be assigned a high risk score (e.g., a low assurance level/score) and thus required to provide a biometric authentication. A high enough risk score may even prevent access to more sensitive features on the website like accessing stored payment tenders. An extremely favorable score may even relax controls for a given user. Between the lowest and highest risk scores, a gradient of different authentication methods can be assigned to different risk scores.

Although the system described herein is primarily described with respect to customers of an ecommerce website (e.g., an online store), the system can also be expanded to support team members who access a target system, or business partners who interact with a website.

Particular embodiments described herein include a method for assessing risks posed a web site guest. The method can include receiving, at a computing device, a request for an internal reputation of a guest using a guest device interacting with a website; collecting, at the computing device, guest-related data from a plurality of different service engines; aggregating, at the computing device, contextual information from the guest-related data; calculating, at the computing device, a risk score based on the contextual information, the risk score representative of the internal reputation of the guest using the guest device; generating, at the computing device, a recommended action based on the risk score; and transmitting, at the computing device, the recommended action or the risk score to a remote computing device, the remote computing device configured to modify content of the website according to the risk score.

In some implementations, the system can optionally include one or more of the following features. The plurality of different service engines may include a guest profile analysis engine. The guest profile analysis engine is configured to perform operations including identifying guest device information about the guest device; retrieving historical device information about a plurality of devices having interacted with the web site; comparing the guest device information with the historical device information; determining a matching between the guest device and any of the plurality of devices; and generating facts based on the comparison and the matching determination, the facts being part of the guest-related data. The guest device information may include one or more browser attributes. The browser attributes may include at least one of browser type, version, installed fonts, OS, platform, version incrementing, cookies, do-not-track mode, internal storage, user agent, vendor, renderer, resolution, and time zone. The plurality of different service engines may include a geolocation analysis engine, the geolocation analysis engine configured to perform operations including identifying guest device information about the guest device, the guest device information including an IP address of the guest device; identifying historical device information about the guest device, the historical device information including a previous IP address of the guest device; determining a current location of the guest device based on the IP address; determining a previous location of the guest device based on the previous IP address; and calculating a travel speed of the guest device based on the current location and the previous location, the travel speed being part of the guest-related data; and generating data based on a risk associated with the travel speed. The operations may further include calculating a score based on the travel speed, the score being part of the guest-related data. The plurality of different service engines may include an external IP analysis engine. The external IP analysis engine is configured to perform operations including identifying guest device information about the guest device, the guest device information including an IP address of the guest device; determining one or more masking schemes of the IP address; and calculating a score based on the masking schemes, the score being part of the guest-related data. The masking schemes may include one or more of a virtual private network (VPN), a hosting provider, a Tor Exit Node, and a proxy server. The plurality of different service engines may include an external data collection engine. The external data collection engine is configured to perform operations including detecting a pattern of an interaction by the guest device with the website; and calculating a threat score based on the pattern, the threat score being part of the guest-related data. The operations may further include receiving a user input of managing the threat score for the guest device. The remote computing device may include a web server hosting the website. The internal reputation of the guest device may include a level of potential security threat of the guest device on the website. The modified content of the website may include an adjusted authentication requirement for a resource which the guest device is accessing.

Particular embodiments described herein include a system for assessing risks posed by a website guest. The system may include a data processing apparatus and a memory device storing instructions that when executed by the data processing apparatus cause the server to perform operations including receiving a request for an internal reputation of a guest device interacting with a website; collecting guest-related data from a plurality of different service engines; aggregating contextual information from the guest-related data; calculating a risk score based on the contextual information, the risk score representative of the internal reputation of the guest device; generating a recommended action based on the risk score; and transmitting the recommended action or the risk score to a remote computing device, the remote computing device configured to modify content of the website according to the risk score.

In some implementations, the system can optionally include one or more of the following features. The plurality of different service engines may include a guest profile analysis engine. The guest profile analysis engine is configured to perform operations including identifying guest device information about the guest device; retrieving historical device information about a plurality of devices having interacted with the web site; comparing the guest device information with the historical device information; determining a matching between the guest device and any of the plurality of devices; and generating facts based on the comparison and the matching determination, the facts being part of the guest-related data. The guest device information may include one or more browser attributes. The plurality of different service engines may include a geolocation analysis engine. The geolocation analysis engine is configured to perform operations including identifying guest device information about the guest device, the guest device information including an IP address of the guest device; identifying historical device information about the guest device, the historical device information including a previous IP address of the guest device; determining a current location of the guest device based on the IP address; determining a previous location of the guest device based on the previous IP address; and calculating a travel speed of the guest device based on the current location and the previous location, the travel speed being part of the guest-related data. The plurality of different service engines may include an external IP analysis engine. The external IP analysis engine is configured to perform operations including: identifying guest device information about the guest device, the guest device information including an IP address of the guest device; determining one or more masking schemes of the IP address; and calculating a score based on the masking schemes, the score being part of the guest-related data. The plurality of different service engines may include an external data collection engine, the external data collection engine configured to perform operations including detecting a pattern of an interaction by the guest device with the website; and calculating a threat score based on the pattern, the threat score being part of the guest-related data. The modified content of the website may include an adjusted authentication requirement for a resource which the guest device is accessing.

The devices, system, and techniques described herein may provide one or more of the following advantages. Some embodiments described herein include a system for automatically building internal reputations of customers of a web site using digital applications from a variety of internal and external sources, and providing such internal reputations to security analysts to help easily identifying and remediating potential security threats imposed by the customers on the website. Such internal reputations of the customers can be generated in the form of risk scores that are easily evaluable, yet representative of a wide range of factors thoroughly indicative of the potential security threats by the customers. The system described herein can collect facts and insights from a variety of internal and external sources, and produce contextual information which thoroughly represents the customers' interaction with the website.

Some embodiments of the system can provide one or more different micro services that can be used for guest risk scoring. For example, the system can increase website security by using website guest risk scores to all digital guests to a website, and reduce fraud and theft by providing guest risk scores to digital applications (e.g., online shopping checkout applications). Moreover, the system can extend guest sessions by adjusting security levels for the guest so that, for example, the guest can perform a checkout without having to reauthenticate to do so. As such, the system can reduce friction (e.g., guest reauthentication or additional verification for certain high-risk services) for guests who interact with various services provided by a website.

Some embodiments of the system can decrease the number of screens shown to the users and also decrease overall time-to-buy for low risk guests. Further, the system can help security analysts to effectively mitigate any identified risks.

Some embodiments of the system described herein can be used to identify resellers and adjust fulfillment options. For example, to prevent shorting store inventory and increasing out of stocks, products may be shipped from warehouses for resellers. If the system detects that a customer is a reseller, the system can operate to limit their promotions so that they cannot abuse the original promotions (e.g., promotions provided by an original seller or a company that operates the system) in an attempt to receive greater discounts or quantities across a set of account. For example, the system can block promotions and/or cancelling orders.

The details of one or more implementations are set forth in the accompanying drawings and the description below. Other features and advantages will be apparent from the description and drawings, and from the claims.

BRIEF DESCRIPTION OF THE DRAWINGS

FIG. 8 illustrates an example user interface for displaying contextual information and receiving a user input for managing and modifying such information.

FIG. 11 illustrates an example user interface for displaying contextual information and receiving a user input for managing and modifying such information.

DETAILED DESCRIPTION OF ILLUSTRATIVE EMBODIMENTS

This document generally describes systems for assessing potential risks posed by web site guests, which can be used in a variety of ways to mitigate such risks and/or to provide curate guest experiences with a website, such as an online store. Internal reputations of digital applications being used by customers of a website can be determined by obtaining, for example, contextual information of the customers' digital applications and generating risk scores of guests using the digital applications or devices. In addition, internal reputations (e.g., contextual information and/or risk scores) can be used to dynamically customize guest facing content, thereby providing the customers with different user experiences with the website according to the level of potential security threats associated with their interactions. For example, the system can dynamically adjust security levels desirable for such customers, while providing a sufficient level of security on the online store.

Figure 1:
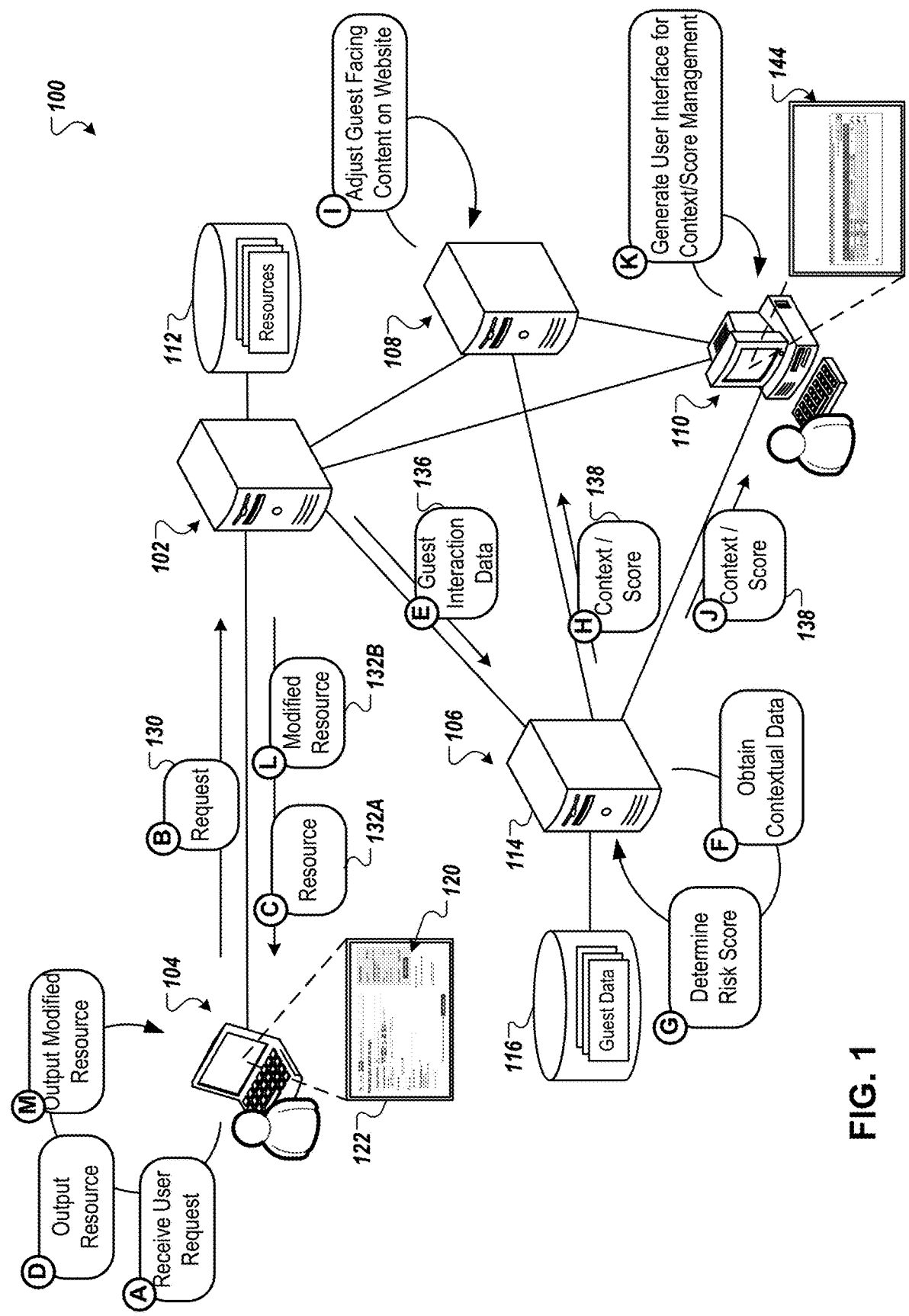
FIG. 1 is a block diagram of an example computer network environment for assessing a security risk of a guest accessing a website.

FIG. 1 is a block diagram of an example computer network environment 100 for assessing a security risk of a guest (e.g., a digital application) accessing a website, such as an online store, and providing curated guest experience with the website. The network environment 100 includes a web server 102, a guest computing device 104, a guest assessment system 106, a content customization system 108, and an analyst computing device 110.

The web server 102 hosts a website 120 including one or more webpages. The web server 102 connects to a website resources database 112 storing code (e.g., HTMP, scripts, style sheets, server-side code, client-side code, etc.) that the web server 102 executes and/or distributes to provide the website 120 (e.g., webpages thereof) on guest computing devices. The guest computing device 104 is used to access a website 120 (e.g., one or more webpages thereof) from the web server 102. The guest computing device 104 can run a browser 122 for a user to access the website 110.

The guest assessment system 106 operates to assess a security risk that a digital application being used by a guest potentially imposes on the website. The guest assessment system 106 can build an internal reputation of the digital application being used to access a website by collecting contextual information and calculating a risk score according to the contextual information. In some implementations, the guest assessment system 106 can include a guest analysis computing device 114 and a guest data warehouse 116. The guest analysis computing device 114 can aggregate a variety of facts and insights from one or more sources, and produce contextual information associated with the guest's digital application. The guest analysis computing device 114 can further calculate a risk score based on the contextual information. Such a risk score can represent a level of security risk from the digital application being used by the guest. As described herein, the contextual information and/or the risk score can be used to customize content on the website to provide guest experience adaptive to the level of potential security threats associated with the guest's interaction with the website. The guest data warehouse 116 can store historical data about guests and digital applications used by the guests with respect to the website. The guest data warehouse 116 can further store the data about the guest currently accessing or attempting to access the website. Although the guest assessment system 106 is primarily illustrated as separate from the web server 102, it is understood that the guest assessment system 106 can be part of the web server 102.

The content customization system 108 operates to dynamically adjust guest facing content on the website as the guest interacts with the website. In some implementations, the content customization system 108 is separate from the guest assessment system 106 and exists at a customer level. The content customization system 108 can use the contextual information and/or the risk score that are determined by the guest assessment system 106, and modify the content (e.g., code, files, etc.) of the website according to the risk assessment results (e.g., based on the contextual information and/or the risk score). For example, the content customization system 108 can dynamically adjust a security level desirable for the guest, thereby providing convenient and smooth guest experience with the website without requiring a higher authentication requirement for the guest than actually needed. Although the content customization system 108 is primarily illustrated as separate from the web server 102 and the guest assessment system 106, it is understood that the content customization system 108 can be part of the web server 102 and/or the guest assessment system 106.

The analyst computing device 110 is used by a security analyst to monitor network security and identify potential security threats on the web site. The analyst computing device 110 can operate to receive an input from a security analyst for various security-related operations, and output information for the analyst to review. Further, the analyst computing device 110 can communicate with the guest assessment system 106 to receive data therefrom for outputting to a security analyst, and transmitting inputs to the guest assessment system 106 for managing or controlling the data therein. In addition, the analyst computing device 110 can communicate with the content customization system 108 to receive data therefrom for outputting (e.g., displaying) to a security analyst, and transmitting inputs to the content customization system 108 for managing or controlling the data therein. In some implementations, the analyst computing device 110 can communicate with the web server 102 to receive data therefrom for outputting to a security analyst, and transmitting inputs to the web server 102 for managing or controlling the data therein.

Referring still to FIG. 1, an overall process is described which is for assessing the risk posed by a guest visiting a website and dynamically providing a guest experience adapted to a security risk associated with the guest. The guest computing device 104 receives a user input from a guest to access and interact with a website 120 from the web server 102 (Step A). The guest computing device 104 can run a browser 122 for accessing the website 120. The browser 122 can identify and retrieve resources, such as individual webpages, files, and other contents, from the web server 102 by a distinct Uniform Resource Locator (URL), and display them on the guest computing device 104.

The guest computing device 104 transmits a request 130 (e.g., HTTP request) for a web resource (e.g., webpage, file, etc.) to the web server 102 (Step B), and the web server 102 transmits a web resource 132A to the guest computing device 104 in response to the request (Step C). The guest computing device 104 outputs the web resource 132A thereon (Step D). For example, the guest computing device 104 can display a requested web page using the browser 122. In embodiments where the web server 102 provides an online shopping service, the web server 102 provides a plurality of online shopping-related webpages, such as product list pages, login page, checkout page, payment page, and other desirable webpages with which a guest can interact.

The guest assessment system 106 can receive guest interaction data 136 (Step E). The guest interaction data 136 can be obtained by monitoring the communication between the guest computing device 104 and the web server 102. In addition, the guest interaction data 136 can be retrieved from other computing devices or databases. The guest interaction data 136 can include user credentials (ID), cookie-based device ID, and/or one or more browser attributes, for example.

The guest assessment system 106 can obtain contextual data from the guest interaction data 136 (e.g., by processing the guest interaction data 136) (Step F). The contextual data can represent guest behavior with respect to the resources from the web server 102, operation of the digital application (e.g., the browser 122), circumstantial data relating to the guest and the digital application used by the guest to interact with the website 120 hosted by the web server 102. The contextual data can include a variety of facts and/or insights that are collected from one or more sources as described herein.

The guest assessment system 106 can determine a risk score of the guest on the web site (Step G). The risk score can represent a level of security threat that the guest or the digital application being used by the guest may potentially impose on the website 120. The risk score can be calculated based on the contextual data of a particular guest, the digital application being used by the guest, and/or the guest computing device being used. In addition, the risk score can also be based on the historical data about the particular guest and/or other guests of the website (including digital applications and computing devices used by the particular guest and/or other guests).

The guest assessment system 106 can transmit the contextual data and/or risk score 138 to the content customization system 108 (Step H). In some implementations, the content customization system 108 can dynamically adjust guest facing content based on the contextual data and/or risk score 138 (Step I). The content customization system 108 can modify such guest facing content to provide different guest experiences of interacting with the website according to the level of trust. For example, the content customization system 108 can dynamically modify the website code to adjust security levels for access to resources of the website. Depending on the level of security threat by the guest, authentication requirements are elevated or lowered in real time as the guest interacts with the website, so that potentially risky actions (e.g., checkout, payment, user account change, etc.) by new or infrequent customers are prevented from taking place, or that normal or low risk activities (e.g., saving items in an online shopping cart) by patrons can be performed with anonymous access or using remembered credentials without asking for further authentication. In other examples, the content customization system 108 can associate the contextual data and/or the risk score with guest requests or actions. For example, the contextual data and/or the risk score of the guest can be associated with an item order submitted by the guest so that an appropriate action is taken with respect to the item order according to the context and/or the risk of the guest. By way of example, the order item required to be picked up at the store only by the particular guest whose identity can be proved by a government issued ID.

In some implementations, the analyst computing device 110 receives the contextual data and/or risk score 138 (Step J). The analyst computing device 110 can generate a user interface 144 to permit a security analyst to manage the data (including the contextual data and the risk score) collected by the guest assessment system 106 (Step K).

When the guest facing content is modified, the web server 102 transmits a modified resource 132B to the guest computing device 104 (Step L), and the guest computing device 104 outputs the modified resource 132B via the browser 122 (Step M). The modified resource 132B can include modified guest facing content (resources), such as adjusted security levels and authentication requirements according to the type of guest interactions and resources requested.

Figure 2:
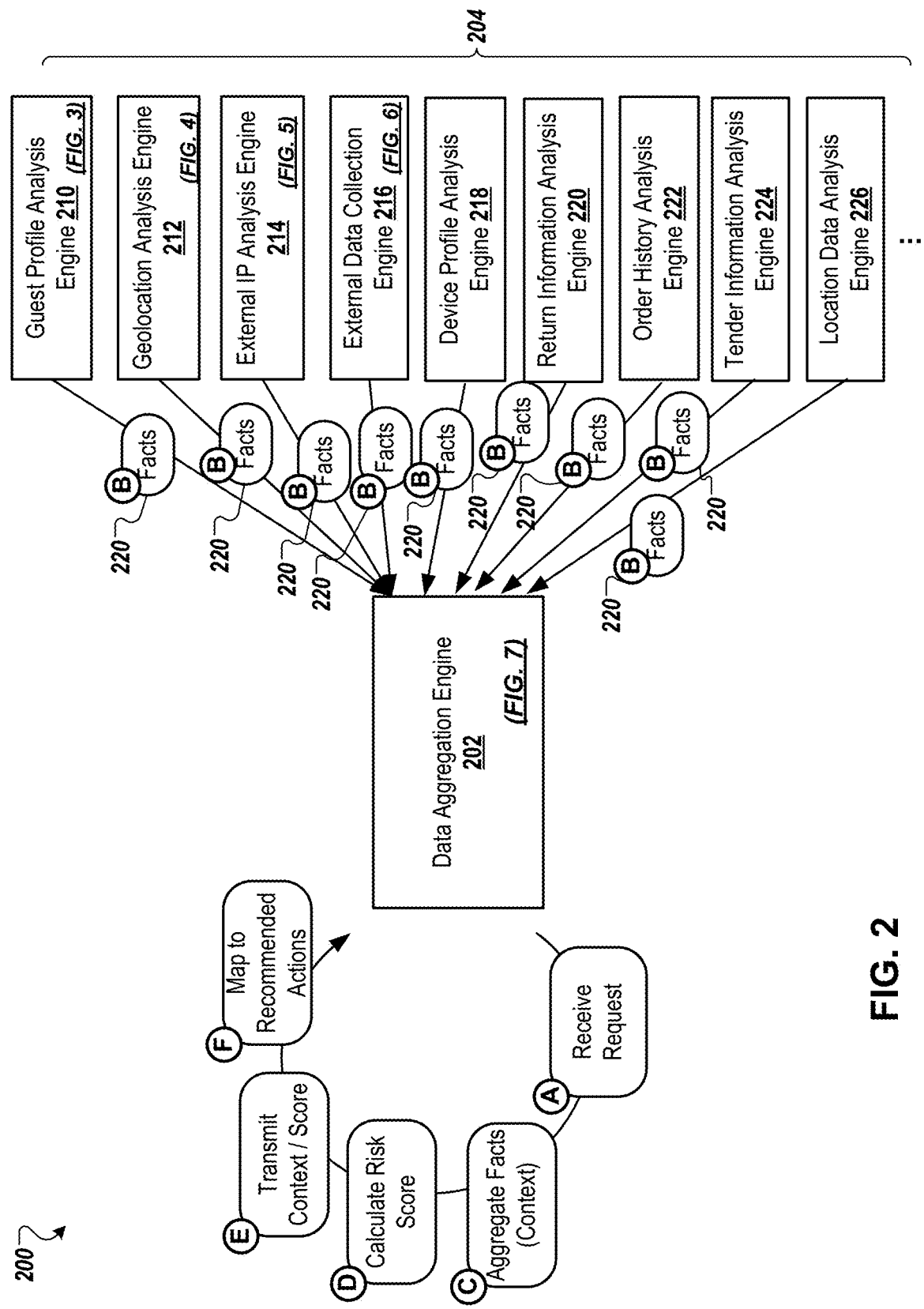
FIG. 2 is a block diagram of an example guest assessment system.

FIG. 2 is a block diagram of an example guest assessment system 200. The guest assessment system 200 can be similar to, and used to implement, the guest assessment system 106 in FIG. 1. The guest assessment system 200 includes a data aggregation and analysis engine 202 ("Aggregator") configured to collect and aggregate input signals or data (e.g., facts, insights, etc.) from one or more sources 204 which analyze the guest and the context of the guest interaction with the website. In some implementations, the data aggregation and analysis engine 202 is configured to collect facts relative to a guest of a website from multiple backend services, such as a guest profile analysis engine 210 ("User Profile Service"), a geolocation analysis engine 212 ("Geolocation Service"), an external IP analysis engine 214 ("External IP Service"), and an external data collection engine 216 ("Threat Intelligent"). Further, the data aggregation and analysis engine 202 can provide a score for the guest at authentication time.

As illustrated in FIG. 2, the data aggregation and analysis engine 202 receives a request from a remote computing device, such as the content customization system 108 or the analyst computing device 110 (Step A). Such a request can include a request for a risk score for the guest vising the website. Alternatively or in addition, the request can include a request for contextual data for the guest of the website. The data aggregation and analysis engine 202 can collect facts (including insights and statistics) 220 from one or more sources 204, such as the guest profile analysis engine 210, the geolocation analysis engine 212, the external IP analysis engine 214, and the external data collection engine 216 (Step B). The data aggregation and analysis engine 202 can then aggregate the collected facts 220 into contextual data for the guest (Step C). The data aggregation and analysis engine 202 can further generate a risk score for the guest (Step D). The data aggregation and analysis engine 202 can transmit the risk score and/or the contextual data to the remote computing device from which the data aggregation and analysis engine 202 received the request (Step E).

In addition or alternatively, the sources 204 can include one or more of a device profile analysis engine 218, a return information analysis engine 220, an order history analysis engine 222, a tender information analysis engine 224, and a location data analysis engine 226.

The device profile analysis engine 218 operates to collect information of a user device that is used to access the website. The device information can include device identifiers, device tracking data (e.g., location history), and device utilization history (e.g., how the device has been used, authentication history, etc.). The device profile analysis engine 218 further operates to associate the device information with the user profile.

The return information analysis engine 220 operates to collect product return information, such as a product return history. For example, the product return information can include return statistics that can include different return types (e.g., walk-in returns, mail-in returns, commercial carrier returns, etc.). Different return types may be associated with different likelihoods of fraud and enforced thresholds.

The order history analysis engine 222 operates to collect order history and analyze order patterns based on the order history. Buying patterns may be associated with different risks of fraud. By way of example, a volume of order, and a type of items being purchased (e.g., highly resalable products) can be identified based on the order patterns and associated with different risks of fraud.

The tender information analysis engine 224 operates to collect tender methods such as types of payment. Different types of payment per same or different purchases can be associated with different risks of fraud. By way of example, if a single payment is made by a large number of gift cards or by a number of different credit cards, such a payment method can flag a potential risk of fraud.

The location data analysis engine 226 operates to collect information of various locations associated with product purchase or shipment, such as where an item is shipped, which store is visited to purchase or pick up an item, etc. Such locations of product purchase or shipping can be associated with different likelihoods of fraud.

The sources 204 are not limited to those described herein and can include other suitable sources. Further, the sources 204 are configurable depending on management purposes and/or the attributes of website being monitored.

Referring still to FIG. 2, the data aggregation and analysis engine 202 can operate to map the collected and/or analyzed data to recommended actions (Step F). In some implementations, the data aggregation and analysis engine 202 can generate recommended actions based on the aggregated data and/or the calculated risk score. The recommended actions can be used to modify attributes of the website (e.g., guest facing contents, authentication requirements, etc.), or help making business decisions (e.g., order fulfillment methods, return requirements, guest/user managements, other marketing decisions, etc.). Accordingly, instead of providing "facts" or risk scores, the system 200 can explicitly provide an action that is recommended for a backend service to take. By way of example, depending on the risk of a certain event is evaluated to be "high," "medium," or "low," the corresponding action may be "block," "step up," or "allow" the event, respectively. This technique can allow decoupling the internal logic or algorithm from the recommended actions to the consuming services.

In one example, depending on data collected from one or more sources 204, the engine 202 can generate a recommended return requirement for a particular order or a user/device that makes the order. In particular, the collected data may represent a particular risk level of fraud. The recommended return requirement can be selected to mitigate such a risk level of fraud. By way of example, the recommended return requirement can include a requirement for returning a purchased item at a store by walk-in (instead of shipping back) if the collected data represents a relatively high risk of fraud. Alternatively, the recommended return requirement can be to allow the user to keep the ordered item and get a refund, if the collected data indicates a relatively low risk of fraud and/or if the return shipping costs is relatively high.

In another example, the engine 202 can generate recommendations to simply deploy allowed activities, step up activities, or block activities, based on risks associated with the collected data from the sources 204. For example, where a user uses a device (e.g., a mobile device) running an application (e.g., a mobile app) to access the website, the engine 202 can generate recommendations to (i) allow the user to perform activities as usual (without additional restrictions, such as without requiring additional authentication), (ii) require additional frictions/restrictions against the user (e.g., requiring additional authentication to perform particular actions such as completing an order), or (iii) blocking the user from performing a particular activity or any activities.

Figure 3:
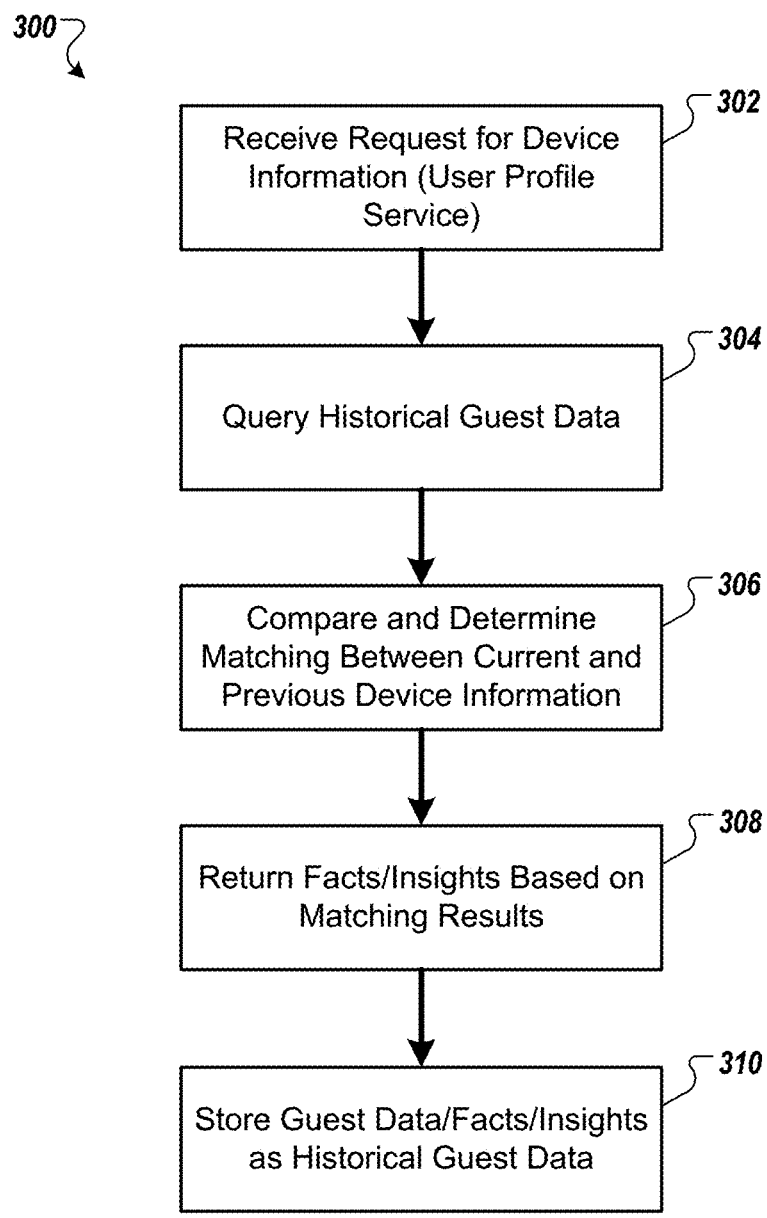
FIG. 3 is a flowchart of an example method of operating a guest profile analysis engine of FIG. 2.

FIG. 3 is a flowchart of an example method 300 of operating the guest profile analysis engine 210 of FIG. 2. The guest profile analysis engine 210 provides assessment data about a guest visiting a website. In some implementations, the guest profile analysis engine 210 is configured to provide facts and/or insights about guest information using, for example, a guest device (e.g., a browser or a guest computing device running such a browser) and/or a location history. For example, the guest profile analysis engine 210 can receive a collection of device attributes (e.g., browser attributes) and IP address for a guest request, and retrieve historical data about the guest's device attributes (e.g., browser attributes) and location information which is derived from the IP address. The guest profile analysis engine 210 can compare the subject data of the guest (e.g., the device attributes and IP address of the guest in question) with the historical data, and generate one or more facts and/or insights based on the comparison.

For example, the guest profile analysis engine 210 can determine if the guest device has been previously used with respect to the website with which the guest is currently interacting. In addition or alternatively, the guest profile analysis engine 210 can determine if the current location of the guest device is a location from which the guest frequently comes or has ever come at all. The guest profile analysis engine 210 can use matching algorithms or rules to make such determinations, such as device matching and location matching.

For device matching determination, the guest profile analysis engine 210 can identify device information about the guest device being used to access the website. For example, the device information can include user credentials (ID), cookie-based device ID, and/or one or more browser attributes. Example of such browser attributes include a browser type (e.g., Chrome™, Internet Explorer™, Safari™, Firefox™, etc.), version, installed fonts, OS, platform, version incrementing, cookies, do-not-track mode, internal storage, user agent, vendor, renderer, resolution, time zone, etc. The guest profile analysis engine 210 can further retrieve historical device information about guest devices that have interacted with the website. The guest profile analysis engine 210 can compare the subject device information with the historical device information using one or more matching algorithms (or rules), and determine if the guest device in question has ever been used with respect to the website before.

The guest profile analysis engine 210 can identify any iterations in one or more aspects between the subject device information and the historical device information, and link such iterations of the subject device to a previous device found in the historical device information, to determine whether the subject device is actually the same as the previous device. By way of example, if a subject guest device has new fonts installed since the previous login activity a day ago, the guest profile analysis engine 210 can identify such a iteration (new fonts installed), and determine that the current guest device is identical to the guest device used for the previous login activity yesterday. In another example, the guest profile analysis engine 210 can identify other iterations, such as a browser upgrade, and determine whether such iterations are sufficiently minor so that the current guest device can be found to be identical to a historical guest device having a previous version. In other example, if the number of iterations of the same type is found to exceed a threshold number, if a particular iteration is found to exceed a threshold range of variation, and/or if a combination of different types of iterations is found to exceed a threshold number, the guest profile analysis engine 210 can determine that the current guest device is unverifiable, or that the current guest device has no matching previous device, which may mean that the current guest device is determined to have not been used with respect to the website before.

Matching algorithms can include various matching criteria. For example, two devices are considered to match if the OS, platform and browser family are identical between the devices. In addition or alternatively, a device matching can be established if the browser versions of two devices stay the same or with some increment (e.g., with the same increment). In addition or alternatively, a device matching can be established if one or more attributes, such as local storage, do-not-track mode and cookies, remain intact between the devices. In addition or alternatively, other attributes can be considered, such as user agent, vendor, renderer, language, resolution and time zone. In some implementations, some attributes are required to stay identical or similar to determine that two devices are identical. For example, a predetermined number (e.g., two) of attributes among a predetermined group of attributes (e.g., user agent, vendor, renderer, and language) may be allowed to be dissimilar to still determine that two devices are identical. In some implementations, similarity can be measured with a Levenshtein distance ratio, and two attributes can be considered to be similar if the ratio is greater than a preset value (e.g., 0.75). In addition or alternatively, a predetermine number (e.g., one) of attributes among a predetermined group of attributes (e.g., resolution and time zone) may be allowed to change between two devices to still determine that the device are identical. In addition or alternatively, a total number of attributes that changed among a predetermined group of attributes (e.g., user agent, vendor, renderer, language, resolution, and time zone) needs to be no greater than a threshold value (e.g., two) to consider two devices to be identical.

In addition or alternatively, a location matching can be used to determine the matching between two devices. For example, the locations of two devices can be derived from their IP addresses, and compared if they come from the same location, such as the same country, the same state, the same city, etc.

In some implementations, matching requirements can become stricter (and more detailed investigation is needed) as a guest requests more core tasks (e.g., checkout) that are more vulnerable to security compromise than rudimentary tasks (e.g., browsing shopping items or saving them in a shopping cart).

In addition or alternatively, other algorithms can be used to compare two devices. One example is using browser fingerprints of two devices. Example technologies of using browser fingerprints are described in Antoine Vastel, et al, *FP-STALKER: Tracking Browser Fingerprint Evolutions*, IEEE S. P 2018—39th IEEE Symposium on Security and Privacy, May 2018, San Francisco, United States, pp. 728-741, the disclosure of which is incorporated herein by reference.

Referring still to FIG. 3, the method 300 can begin by the guest profile analysis engine 210 that receives a request for user profile service (Block 302). The request can look for facts and/or insights about a guest visiting the website. The request can include guest-related data, such as the device information about the guest device being used to interact with the website. The device information can include user credentials, device ID, and browser attributes including browser type, version, installed fonts, OS, platform, version incrementing, cookies, do-not-track mode, internal storage, user agent, vendor, renderer, resolution, time zone, etc. The guest profile analysis engine 210 can query historical guest-related data, such as historical device information about guest devices (Block 304). The guest profile analysis engine 210 can compare the current guest-related data with the historical guest-related data, and determine any matching therebetween based on one or more matching criteria, such as those described above (Block 306). The guest profile analysis engine 210 can return facts and/or insights collected and determined based on the matching process (Block 308). In some implementations, such facts and/or insights can be transmitted to the data aggregation and analysis engine 202 (FIG. 2). The guest profile analysis engine 210 can save the guest-related data and/or the facts/insights as part of the historical guest-related data (Block 310), which can be used when the method is performed again with another request.

An example list of facts and/or insights that the guest profile analysis engine 210 can return can include (1) GUID_DEVICE_MATCH (the device information provided matched device information that the guest has previously authenticated with; (2) VISITORID_DEVICE_MATCH (in addition to be a GUID_DEVICE_MATCH, the matching record also has the same visitorId, which means the same cookie existed in both browsers); (3) PREVIOUS_DEVICEID_DEVICE_MATCH (in addition to both GUID_DEVICE_MATCH & VISITORID_DEVICE_MATCH criteria, the last record for the visitor_id also had the same hash as the previous hash the client device had. This is expected when a refresh flow occurs and a KMSI token is asked to be extended); (4) GUID_CITY_MATCH (the ip lookup returned a city that the guest has previously come from); (5) GUID_SUBDIVISION_MATCH (the ip lookup returned a subdivision(state/province) that the guest has previously come from); (6) GUID_COUNTRY_MATCH (the ip lookup returned a country that the guest has previously come from); (7) NO_GUID_DEVICE_DATA (indicates that the userprofile service (e.g., the guest profile analysis engine) was not able to find any historical device data for the guest); and (8) NO_GUID_LOCATION_DATA (indicates that the userprofile service (e.g., the guest profile analysis engine) was not able to find any historical location data for the guest).

Figure 4:
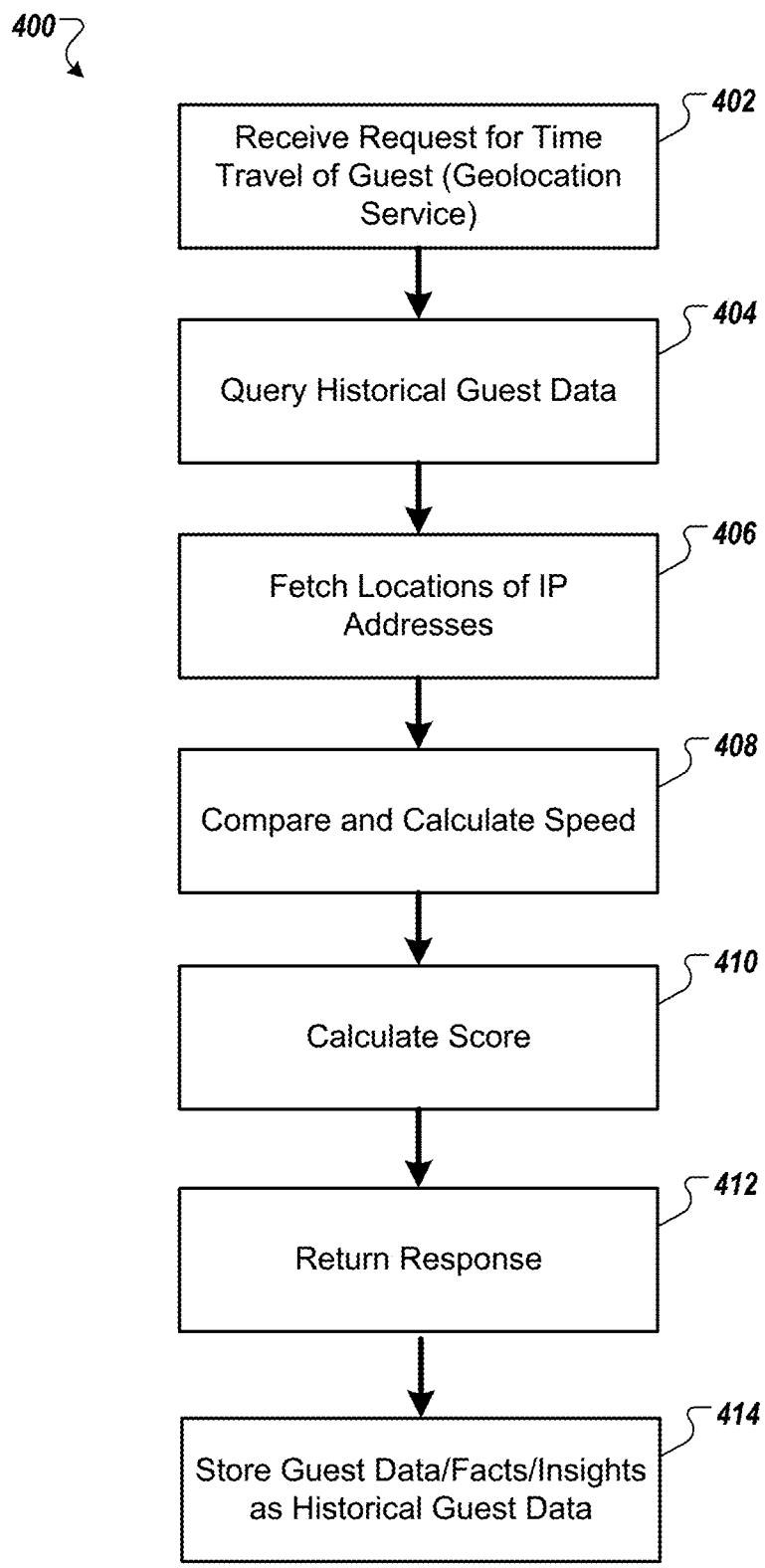
FIG. 4 is a flowchart of an example method of operating a geolocation analysis engine of FIG. 2.

FIG. 4 is a flowchart of an example method 400 of operating the geolocation analysis engine 212 of FIG. 2. The geolocation analysis engine 212 can provide facts and/or insights about travel information about a guest device based on the locations and timings of the guest device interacting or having interacted with the website. For example, the geolocation analysis engine 212 can determine a speed at which a guest's location changed between current and previous interactions with the website (e.g., current and previous login requests). The geolocation analysis engine 212 can further return a score (e.g., risk score) configured for the determined speed. For example, the geolocation analysis engine 212 can determine whether a guest device is determined to have traveled a long distance for a unrealistically short period of time for that distance, and provide a risk evaluation. By way of example, a risk is high if a guest device was found to access the website from Los Angeles, Calif. an hour ago, and the same guest device is now found to access the website from New York, N.Y.

As illustrated, the method 400 can begin by the geolocation analysis engine 212 that receives a request for facts and/or insights about a time travel of a guest visiting the website (Block 402). The request can include guest-related data, such as the device information about the guest device being used to interact with the website. The device information can include a guest ID for identifying the guest, and/or an IP address of a current interaction request by the guest device (e.g., a current login request). The IP address of the current interaction request can be used to identify the location of the guest device. The geolocation analysis engine 212 can query historical guest-related data, such as historical IP address (and/or location information, which can be derived from the IP address) of previous interaction requests by the guest device (e.g., a previous login request) (Block 404). The geolocation analysis engine 212 can fetch the location (e.g., latitude and longitude) associated with the IP address, such as the current and previous IP addresses (Block 406). In some implementations, a third party service, such as a service available by MaxMind (Waltham, Mass.), can be used to obtain such location information.

The geolocation analysis engine 212 can compare the location (and time) of the guest's current interaction with the location (and time) of the guest's previous interaction, and calculate a speed at which the guest device has traveled (Block 408). The geolocation analysis engine 212 can calculate a score based on the speed of the guest device traveling between the current and previous interactions (e.g., current and previous login requests) (Block 410). For example, the score can be calculated based on the speed of travel by the guest based on the distance travelled between the last login request and the current login request. The score can be mapped from the speed to represent whether the velocity is within an acceptable and safe range or not. For example, a table can be provided to correlate between scores and speeds. By way of example, a score can range from 0 to 1, which may be inverse-proportional to a speed such that a high speed is mapped to 0 and a low speed is mapped to 1, for example. The score system can be configurable for different velocity ranges. In some implementations, if the incoming request does not have previous login information, the guest can be identified as a first time user, and a score which is assigned to such a first time user is returned.

The geolocation analysis engine 212 can return a response with facts and/or insights collected and determined based on the comparison and the score (Block 412). The facts and/or insights can include the speed at which the guest is travelling and whether the speed is within a realistic or possible range ("safe_speed") or out of the realistic or possible range ("risky_speed"). The geolocation analysis engine 212 can save the guest-related data and/or the facts/insights as part of the historical guest-related data (Block 414), which can be used when the method is performed again with another request.

Figure 5:
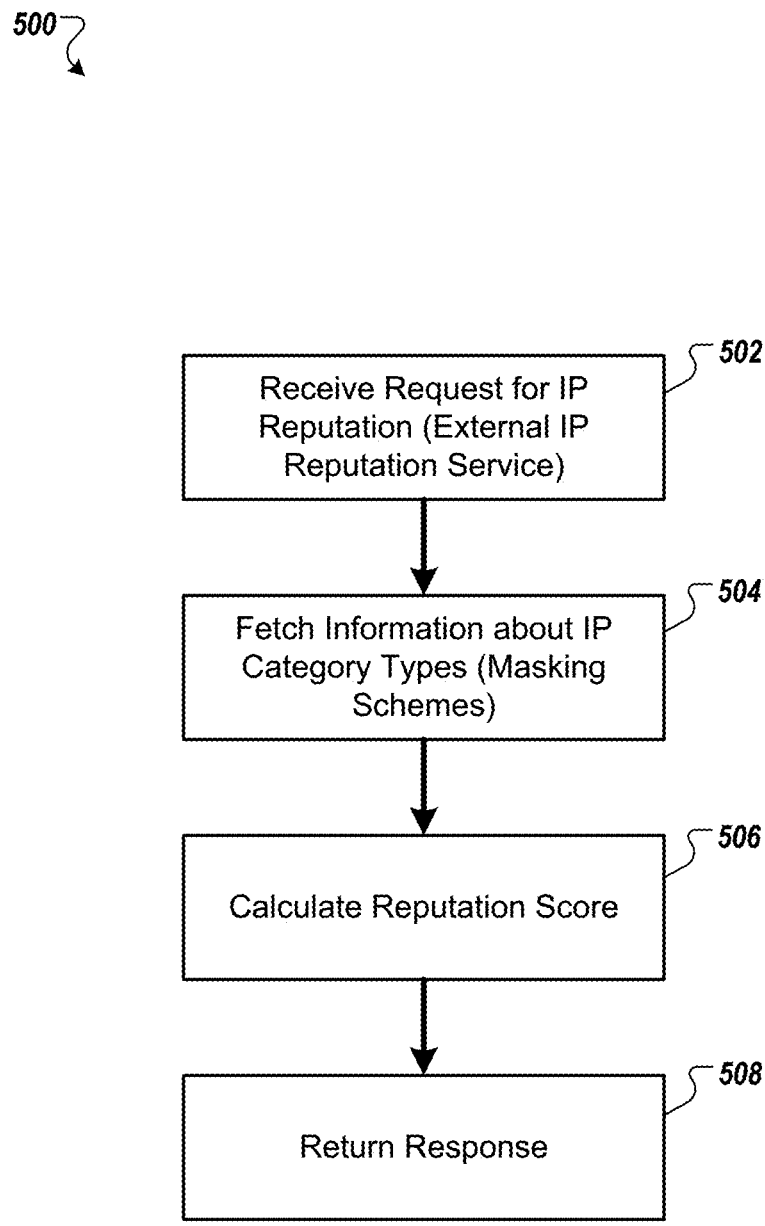
FIG. 5 is a flowchart of an example method of operating an external IP analysis engine of FIG. 2.

FIG. 5 is a flowchart of an example method 500 of operating the external IP analysis engine 214 of FIG. 2. The external IP analysis engine 214 can provide facts and/or insights about reputation of the IP address from a guest device. For example, the external IP analysis engine 214 can determine whether the IP address of a guest device is trustworthy based on its IP reputation from one or more external sources. The external IP analysis engine 214 can determine whether the IP address is anonymized (with one or more masking schemes) and/or what type of masking is used with the IP address. Example masking schemes include a virtual private network (VPN), a hosting provider, a Tor Exit Node, and a proxy server. In some implementations, the external IP analysis engine 214 can use a third party service to identify any masking schemes used with an IP address.

Further, the external IP analysis engine 214 can calculate a score for the IP address reputation. In some implementations, multiple masking schemes is correlated with respective scores. The external IP analysis engine 214 can return a score for the IP address based at least part on the category of the masking scheme(s) used with the IP address. If a combination of multiple masking schemes are used with an IP address, the external IP analysis engine 214 can calculate a total of the scores for the respective masking schemes used with the IP address. The scoring rules or criteria can be configurable.

As shown in FIG. 5, the method 500 can begin by the external IP analysis engine 214 that receives a request for facts and/or insights about an IP reputation of a guest visiting the website (Block 502). The request can include guest-related data, such as an IP address of a current interaction request by the guest device (e.g., a current login request). The external IP analysis engine 214 can fetch information about IP category types (e.g., masking types) (Block 504). In some implementations, a third party service, such as a service available by MaxMind (Waltham, Mass.), can be used to obtain such information. The external IP analysis engine 214 can calculate a score based on the IP category types (e.g., masking schemes) (Block 506). The external IP analysis engine 314 can return a configurable placeholder value based on the category of the IP address. The external IP analysis engine 214 can return a response with facts and/or insights collected and determined above (Block 508). An example list of facts and/or insights that the external IP analysis engine 314 can return may include (1) EiprScore (returns a place holder value based on the category of IP address); (2) CategoryName=IS_VPN (returns true if IP belongs to a virtual private network (VPN) else returns false); (3) categoryName=IS_HOSTING_PROVIDER (returns true if IP belongs to a Hosting Provider else returns false); (4) categoryName=IS_TOR_NODE (returns true if IP belongs to a Tor Exit Node else returns false); and (5) categoryName=IS_PROXY (returns true if IP belongs to a proxy server else returns false).

Figure 6:
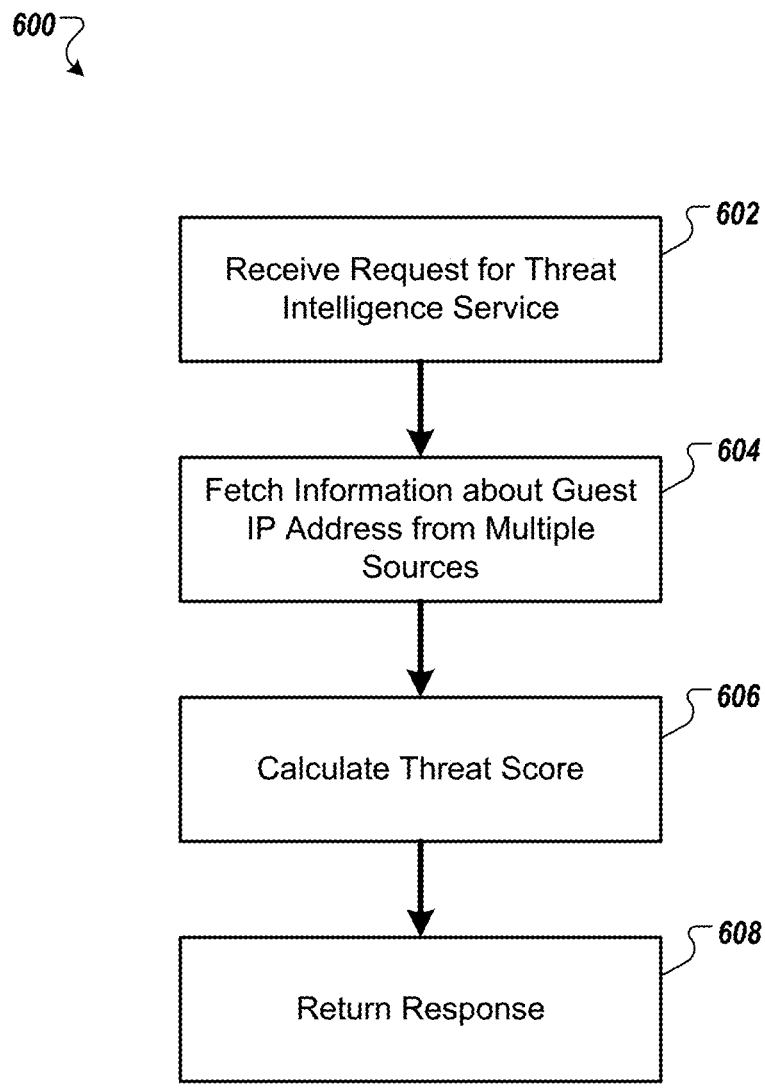
FIG. 6 is a flowchart of an example method of operating an external data collection engine of FIG. 2.

FIG. 6 is a flowchart of an example method 600 of operating the external data collection engine 216. The external data collection engine 216 can provide threat intelligence service that takes an IP address as an input and returns facts and/or insights. Such facts and/or insights can describe rules by which an IP address was detected as a threat. In some implementations, the external data collection engine 216 can determine facts and/or insights by identifying patterns of guest behaviors with respect to the website. Example patterns of guest behaviors being monitored can include a plurality of login attempts with different credentials in a stipulated time (e.g., a single session), a plurality of trials and failures in login attempts in a stipulated time (e.g., a single session), etc. The external data collection engine 216 can collect data from a variety of sources and generate a threat score for a particular guest visiting and/or the contextual information about the guest. Such sources can include a third party external source, such as a service available by Shape Security (Mountain View, Calif.). Further, the data from a variety of sources can include fraud signals (e.g., post checkout signals) and human inputs from a security analyst (e.g., via the analyst computing device 110 in FIG. 1). In addition or alternatively, the external data collection engine 216 can expand its operation to provide internal threat intelligence service and collect data from a variety of internal sources, and generate a threat score.

The external data collection engine 216 can calculate a threat score based on various criteria. For example, the external data collection engine 216 can calculate a threat score based on past threat behavior from the IP address.

In some implementations, the method 600 can begin by the external data collection engine 216 that receives a request for threat intelligence regarding a guest visiting the website (Block 602). Such threat intelligence can include facts and/or insights about potential security threats associated with a guest visiting the website. The request can include guest-related data, such as a name of a client that is calling this service, and the IP address of a current interaction request by the guest device (e.g., a current login request). The external data collection engine 216 can fetch the information associated with the IP address (Block 604). The information about the IP address can be collected from a variety of sources, such as by using an engine that detects a malicious pattern of the guest behavior, from external sources (e.g., news about security compromise), and/or a manual input (e.g., evaluation by a security analyst). The information about the IP address can include not only negative facts/insights, but also positive or neutral facts/insights. Further, the information about the IP address can be provided manually, such as by a security analyst. For example, a security analyst can provide an input to associate certain facts or insights with particular IP addresses. Such an input can be provided by a security analyst using a computing device (e.g., the analyst computing device 110). Such a computing device can generate a user interface (e.g., the user interface 144 in FIG. 1) for the security analyst to manage various facts and/or insights about the guest visiting the website, and also provide an input to manually analyze and evaluate such facts and/or insights with respect to respective guests. Examples of the user interface are described with reference to FIGS. 8-13.

The external data collection engine 216 can calculate a threat score based on the information about the IP address (Block 606). In some implementations, the external data collection engine 216 can automatically assign a score to the IP address based on the collected information about the IP address. In other implementations, a score for an IP address can be manually provided by a security analyst. The score can be of various forms, such as a numerical value (e.g., a range from 0 to 1), discrete levels or categorizations (e.g., low risk, medium risk, and high risk), or flagging (e.g., flag or no flag).

The external data collection engine 216 can return a response with facts and/or insights collected and determined above (Block 608). For example, such a response can include the threat score calculated above, and the facts indicative of rules by which the IP address was detected as a threat.

Figure 7:
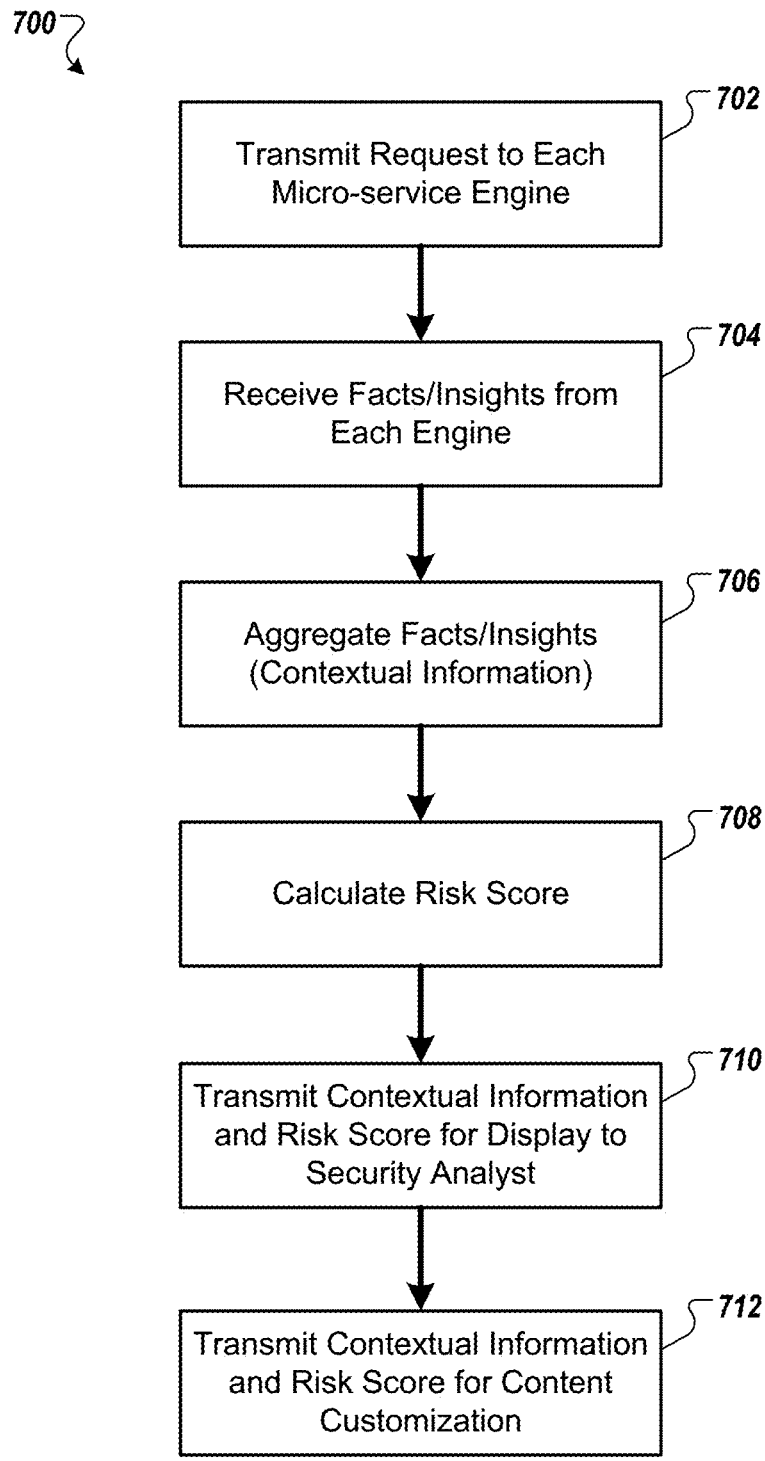
FIG. 7 is a flowchart of an example method for operating a data aggregation and analysis engine of FIG. 2.

FIG. 7 is a flowchart of an example method 700 for operating the data aggregation and analysis engine 202 of FIG. 2. The data aggregation and analysis engine 202 can transmit a request to each micro-service engine for collecting information about a guest interacting with a website (Block 702). Example micro-service engines include the guest profile analysis engine 210, the geolocation analysis engine 212, the external IP analysis engine 214, and the external data collection engine 216, as described in FIGS. 2-6. The data aggregation and analysis engine 202 receives facts and/or insights from each micro-service engine (Block 704), and aggregates the facts and/or insights to produce contextual information about the guest visiting the website (Block 706). The data aggregation and analysis engine 202 can calculate a risk score based on the aggregated facts and/or insights (or the contextual information). The risk score can represent an internal reputation of the guest. In addition or alternatively, the risk score can represent the likelihood and/or degree of security threat that the guest may impose on the website as it interacts with the website. Various algorithms can be used to calculate a risk score. In a simple example, the risk score is given a value of 1 (one) if the current guest device (e.g., a browser) matches a previous guest device and/or if the location (e.g., country) of the current guest device matches the location of the previous guest device. Otherwise, the risk score is given a value of 0.5, which means no matching is found. In some implementations, a risk score can depend on the type of guest interaction. For example, a risk score can increase if the guest requests more core tasks (e.g., checkout) that are more vulnerable to security threat, as opposed to more basic tasks (e.g., browsing shopping items). Calculation of a risk score can include assigning different weightings to multiple facts and/or insights collected from different micro-service engines. Instead of a risk score, the data aggregation and analysis engine 202 can calculate a safety/security risk score, which may be inverse to the risk score.

The data aggregation and analysis engine 202 can transmit the contextual information and/or the risk score for display to a security analyst (Block 710). For example, the contextual information and/or the risk score can be transmitted to a remote computing device, such as the analyst computing device 110 (FIG. 2), which can generate a user interface for displaying the contextual information and/or the risk score, and receiving a user input to manage, modify, and evaluate them.

The data aggregation and analysis engine 202 can transmit the contextual information and/or the risk score for content customization (Block 712). For example, the contextual information and/or the risk score can be transmitted to a remote computing device, such as the content customization system 108, which can dynamically adjust guest facing content on the website as the guest interacts with the website. For example, the content customization system 108 can dynamically adjust a security level desirable for the guest in various ways described herein, thereby providing convenient and smooth guest experience with the website without imposing a higher authentication requirement for the guest than actually required to prevent potential threats.

Figure 9:
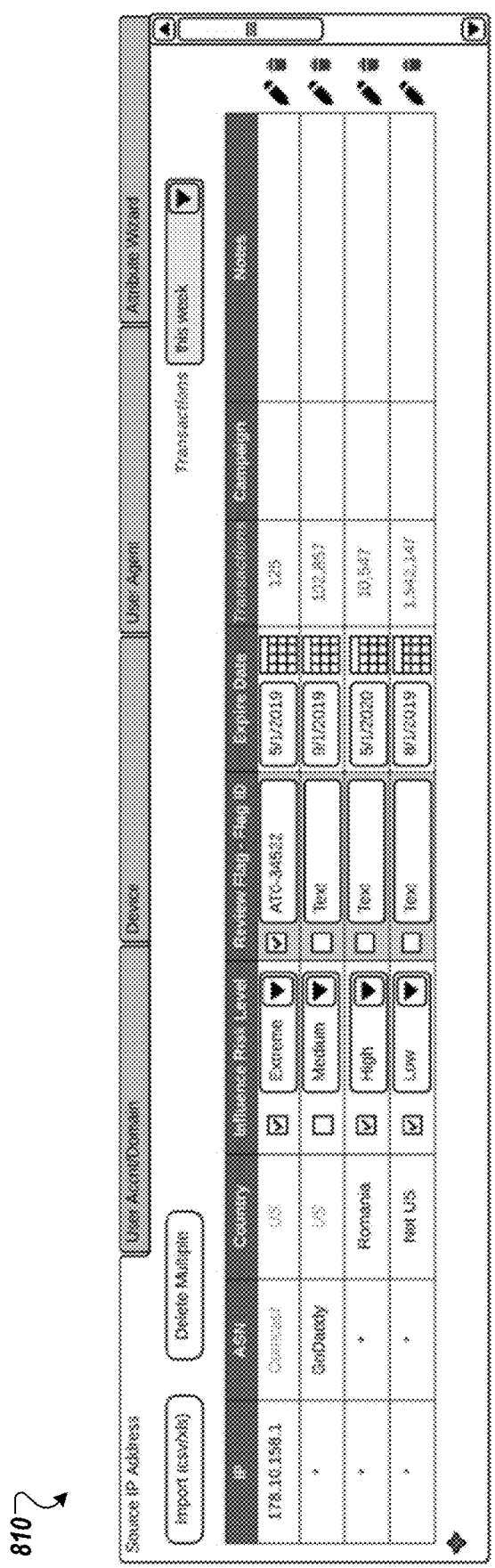
FIG. 9 illustrates an example user interface for displaying contextual information and receiving a user input for managing and modifying such information.
Figure 10:
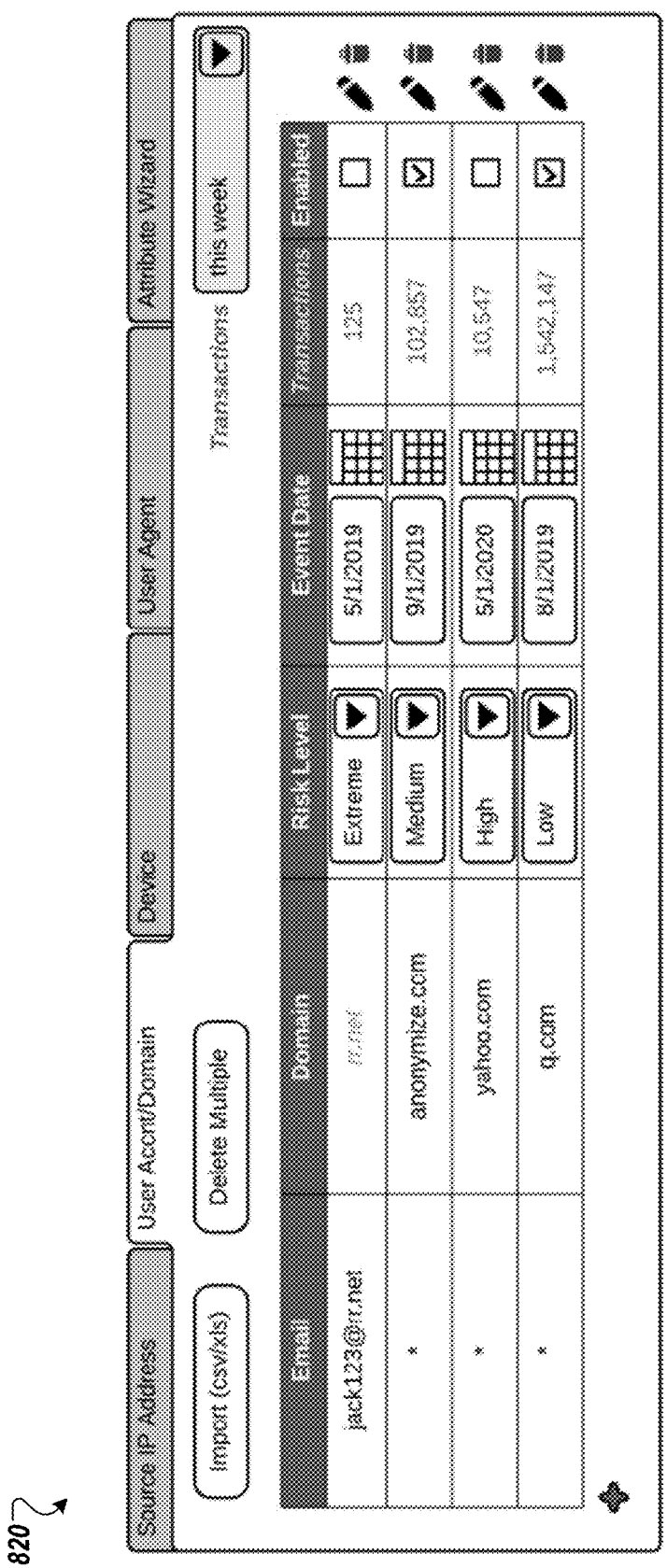
FIG. 10 illustrates an example user interface for displaying contextual information and receiving a user input for managing and modifying such information.
Figure 11:
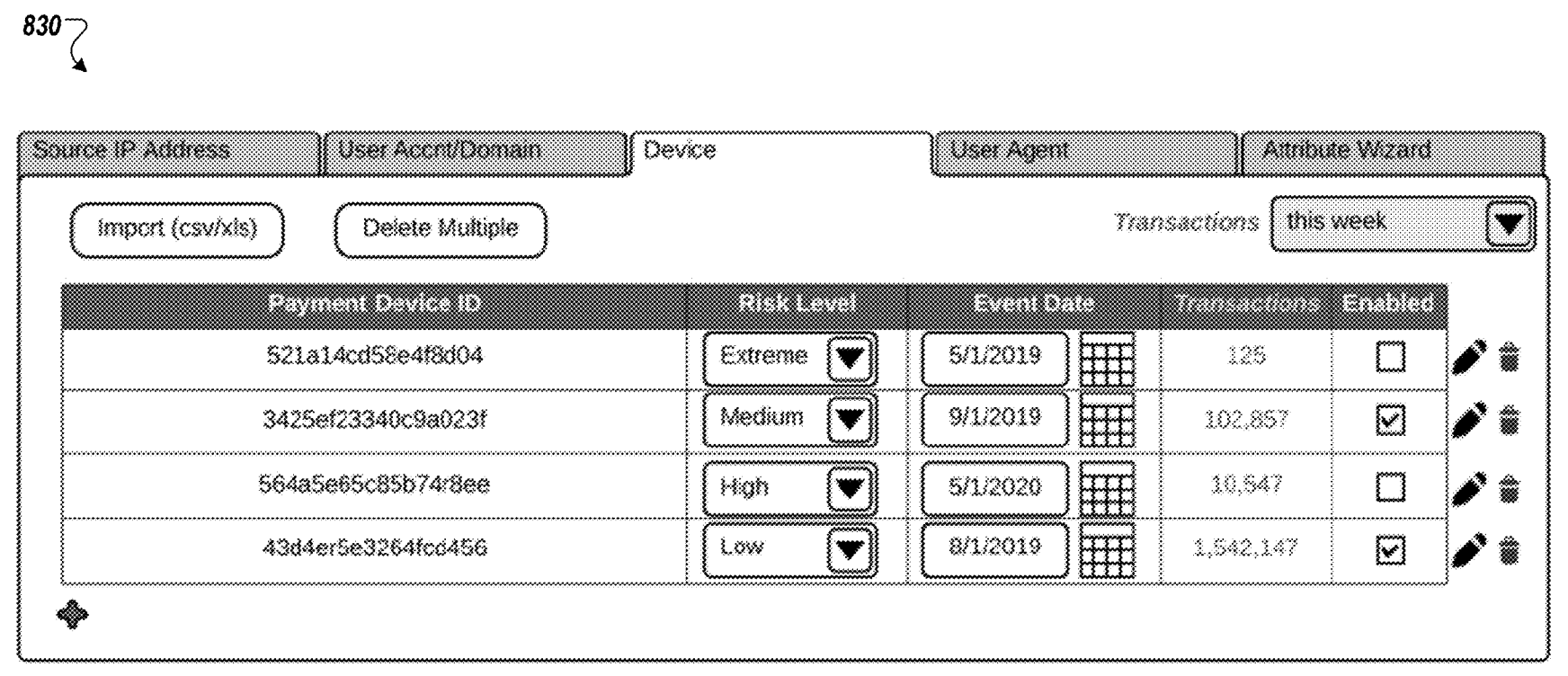
Figure 12:
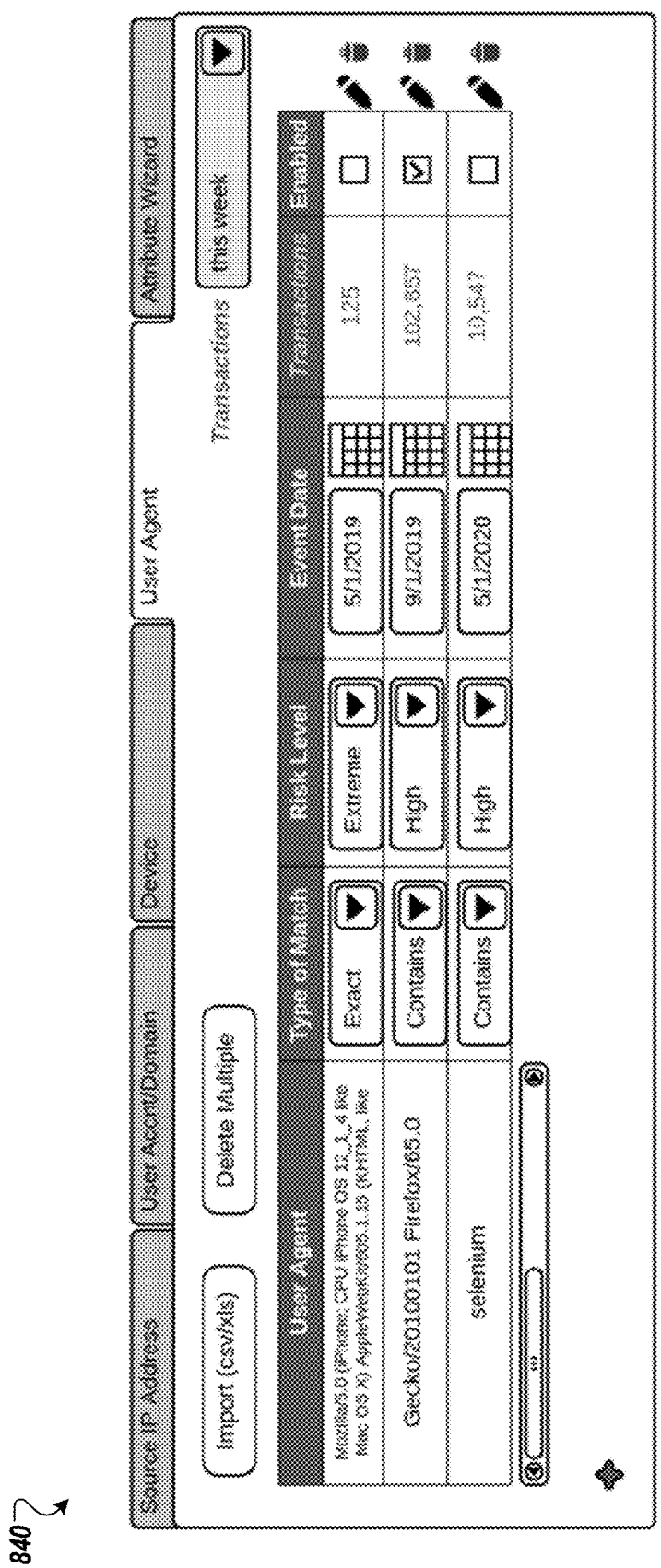
FIG. 12 illustrates an example user interface for displaying contextual information and receiving a user input for managing and modifying such information.
Figure 13:
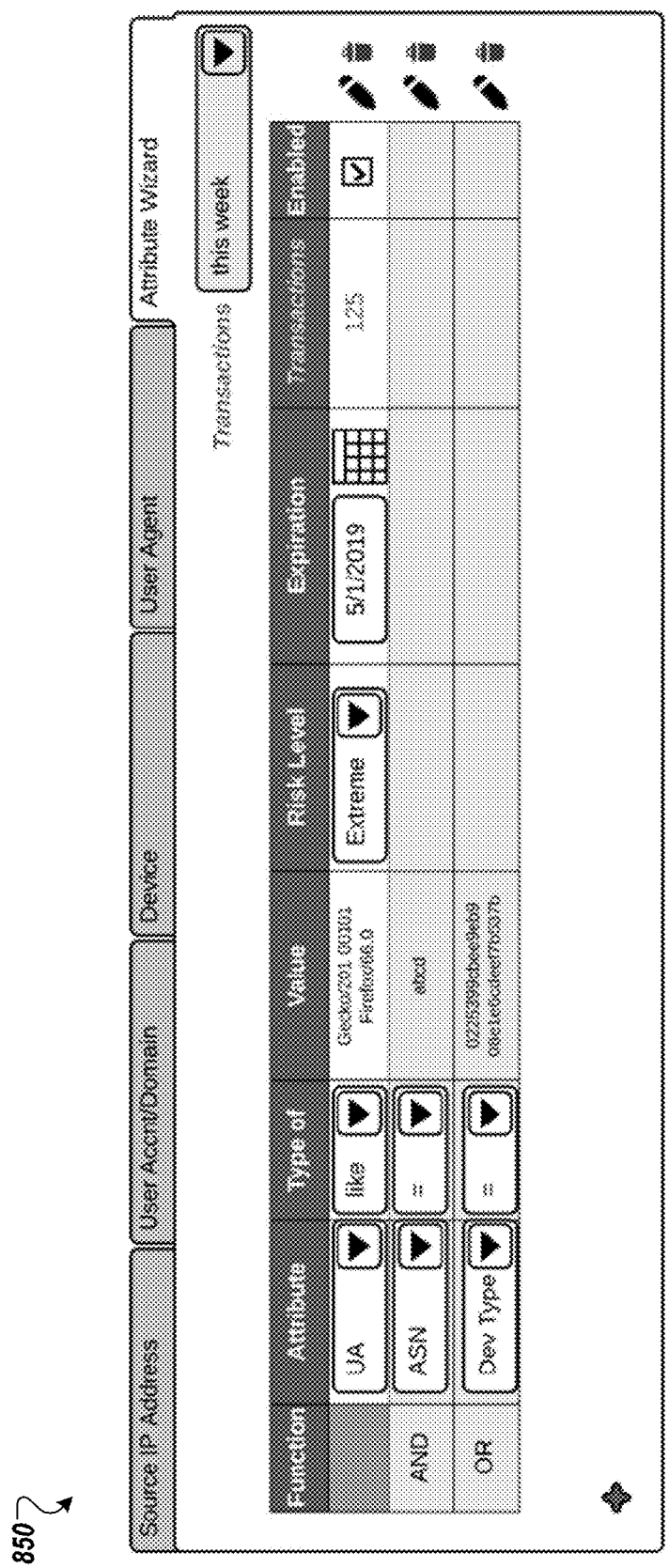
FIG. 13 illustrates an example user interface for displaying contextual information and receiving a user input for managing and modifying such information.

FIGS. 8-13 illustrate example user interfaces for displaying contextual information and receiving a user input for managing and modifying such information. In some implementations, these user interfaces can be generated at the analyst computing device 110 (FIG. 2) so that an analyst can review the context information and modify it as necessary. Referring to FIG. 8, an example user interface 800 is depicted which displays facts and risk levels associated with IP addresses of guests interacting with the website. The user interface 800 can provide a control element for manually modifying the risk level of each IP address. Referring to FIG. 9, another example user interface 810 is depicted which displays facts, risk levels, and flags associated with IP addresses of guests interacting with the website. The user interface 810 can provide a control element for manually modifying the risk level of each IP address, and further provide a control element for manually flagging each IP address with a flag ID. Referring to FIG. 10, an example user interface 820 is illustrated which displays facts and risk levels associated with user accounts and domains. The user interface 820 can provide a control element for manually modifying the risk level of each user account and domain. Referring to FIG. 11, an example user interface 830 is illustrated which displays facts and risk levels associated with each device ID (e.g., payment device ID). The user interface 830 can provide a control element for manually modifying the risk level of each device ID. Referring to FIG. 12, an example user interface 840 is illustrated which displays facts, device matching results, and risk levels associated with each user agent (e.g., browser). The user interface 840 can provide control elements for manually modifying the type of match and the risk level of each user agent. Referring to FIG. 13, an example user interface 850 is illustrated which displays facts and risk levels associated with each attribute. The user interface 850 can provide control elements for manually selecting attributes and types of attributes, and for manually modifying the risk level of each attribute.

Figure 14:
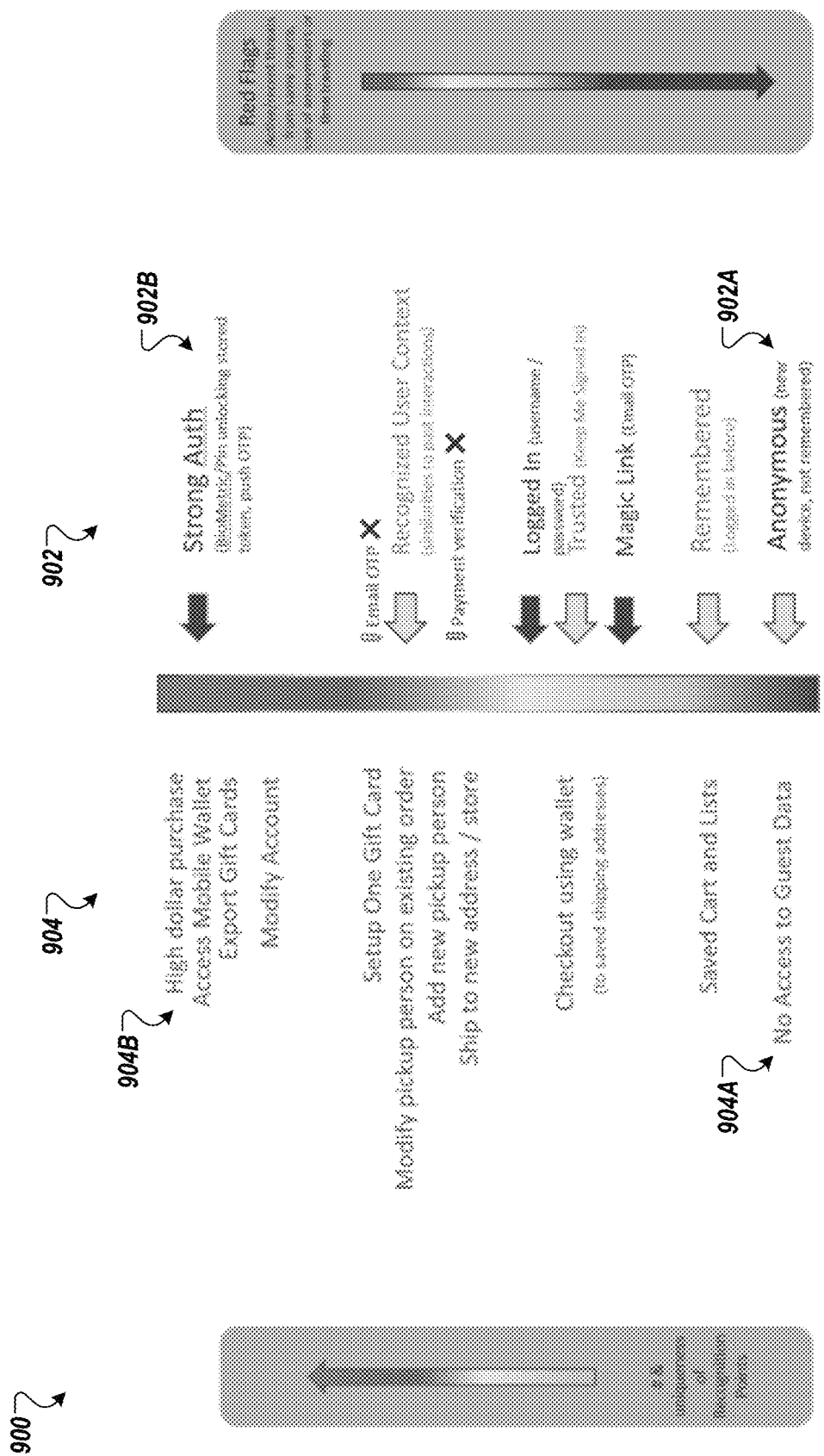
FIG. 14 illustrates an example method for adjusting a security level according to a guest interaction request on a website.

FIG. 14 illustrates an example method 900 for adjusting a security level according to a guest interaction request on a website. In some implementations, the method 900 can be implemented by the content customization system 108 of FIG. 2. For example, the content customization system 108 can modify guest facing content to provide different guest experiences of interacting with the website according to the level of trust.

The method 900 can include dynamically modifying the website code to adjust security requirements for access to different resources of the website, based on the contextual information and risk score. For example, authentication requirements 902 can vary in real time as the guest requests different resources 904 from the website. In general, as the guest interaction involves more risky actions, the more sophisticating authentications are required. In an example spectrum, if the user interaction involves no access to guest data (904A), no authentication is required so that the guest can freely interact with the website (902A). If the user interaction involves high risk activities, such as a high dollar purchase, access to mobile wallet, or exporting gift cards (904B), a high level of authentication are required, such as biometric or pin authentication (902B). In the spectrum between these examples (902A/904A and 902B/904B), there may be other example guest activities with varying degrees of security risk, and the authentication requirements are accordingly adjusted, thereby providing the ability to enable secure and frictionless guest experiences.

Figure 15:
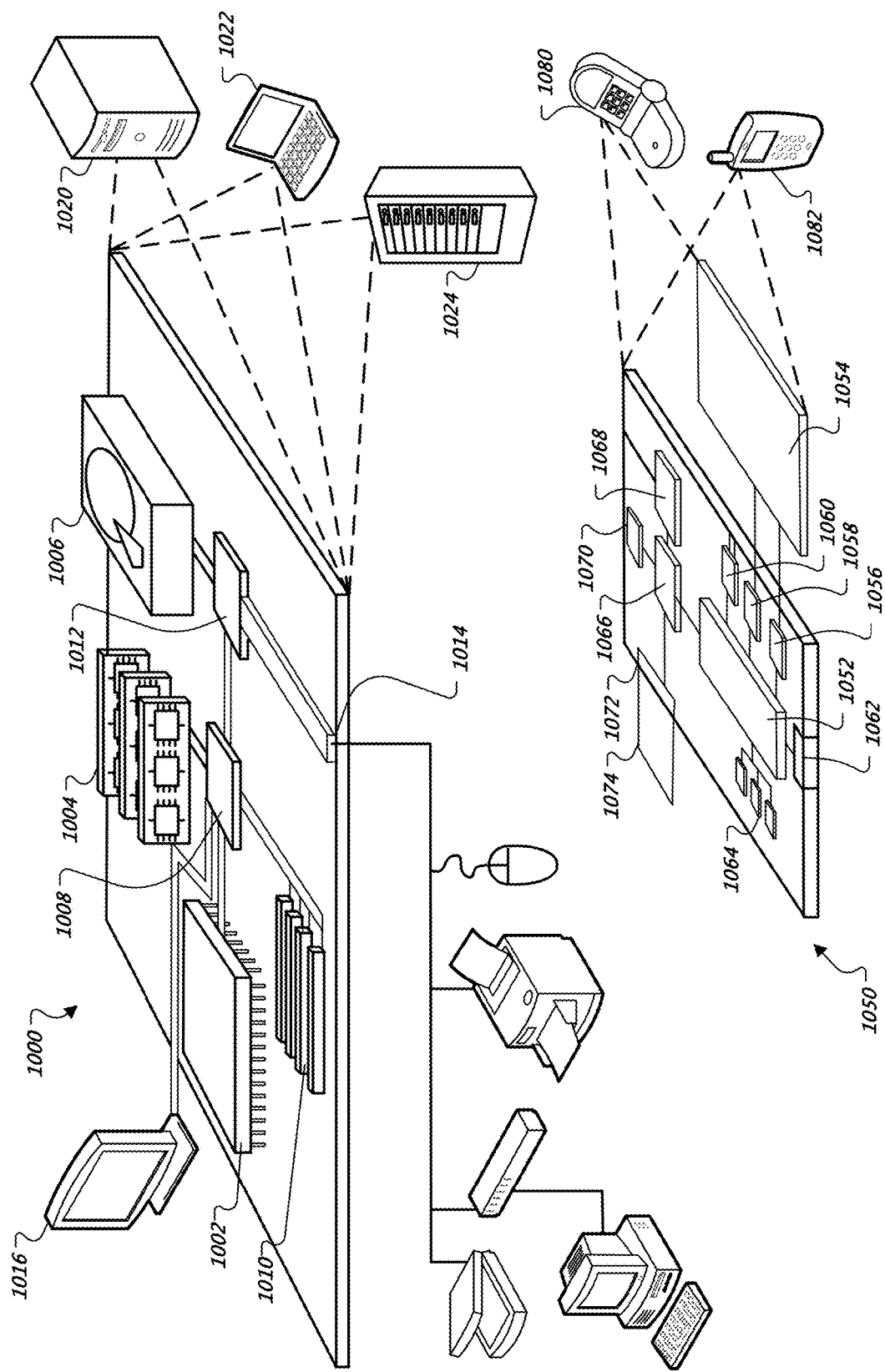
FIG. 15 is a block diagram of computing devices that may be used to implement the systems and methods described in this document, as either a client or as a server or plurality of servers.

FIG. 15 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is an example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chip set of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provided, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for assessing risks posed by a website guest, the method comprising:

receiving, at a computing device, a request for an internal reputation of a guest using a guest device interacting with a website;

collecting, at the computing device, guest-related data from a plurality of different service engines, wherein the plurality of different service engines includes a guest profile analysis engine, the guest profile analysis engine configured to perform operations comprising:

identifying the guest device information about the guest device, wherein the guest device information includes three or more browser attributes, the browser attributes being selected from the group consisting of: browser type, version, installed fonts, OS, platform, version incrementing, cookies, do-not-track mode, internal storage, user agent, vendor, renderer, resolution, and time zone;

retrieving historical device information about a plurality of devices having interacted with the website;

comparing the guest device information with the historical device information;

determining a matching between the guest device and any of the plurality of devices; and generating facts based on the comparison and the matching determination, the facts being part of the guest-related data;

aggregating, at the computing device, contextual information from the guest-related data;

calculating, at the computing device, a risk score based on the contextual information, the risk score representative of the internal reputation of the guest using the guest device;

comparing the risk score against a plurality of threshold risk score values to determine whether to modify current authentication requirements on the website for the guest, wherein the plurality of threshold risk score values comprise a first threshold risk score value and a second threshold risk score value, wherein the first threshold risk score value is less than the second threshold risk score value;

generating, at the computing device, a recommended action with regard to the current authentication requirements based on the comparison between the risk score and the plurality of threshold risk score values, wherein the recommended action is selected from among (i) lowering the current authentication requirements on the website for the guest based on the risk score being less than the first threshold score value, (ii) elevating the current authentication requirements on the website for the guest based on the risk score exceeding the second threshold risk score value, and (iii) maintaining the current authentication requirements on the website for the guest based on the risk score being between the first and second threshold risk score values; and transmitting, at the computing device, the recommended action or the risk score to a remote computing device, the remote computing device configured to modify content of the website according to the recommended action to lower, elevate, or maintain the current authentication requirements on the website for the guest.

2. The method of claim 1, wherein the plurality of different service engines includes a geolocation analysis engine, the geolocation analysis engine configured to perform operations comprising:
- identifying guest device information about the guest device, the guest device information including an IP address of the guest device;
- identifying historical device information about the guest device, the historical device information including a previous IP address of the guest device;
- determining a current location of the guest device based on the IP address;
- determining a previous location of the guest device based on the previous IP address;
- calculating a travel speed of the guest device based on the current location and the previous location, the travel speed being part of the guest-related data;
- calculating a travel speed score based on the travel speed, the travel speed score being part of the guest-related data; and
- generating data based on a risk associated with at least one of the travel speed and the travel speed score.

3. The method of claim 1, wherein the plurality of different service engines includes an external IP analysis engine, the external IP analysis engine configured to perform operations comprising:
- identifying guest device information about the guest device, the guest device information including an IP address of the guest device;
- determining one or more masking schemes of the IP address, wherein the masking schemes include one or more of a virtual private network (VPN), a hosting provider, a Tor Exit Node, and a proxy server; and
- calculating a score based on the masking schemes, the score being part of the guest-related data.

4. The method of claim 1, wherein the plurality of different service engines includes an external data collection engine, the external data collection engine configured to perform operations comprising:
- detecting a pattern of an interaction by the guest device with the website; and
- calculating a threat score based on the pattern, the threat score being part of the guest-related data.

5. The method of claim 1, wherein the remote computing device includes a web server hosting the website.

6. The method of claim 1, wherein the internal reputation of the guest device includes a level of potential security threat of the guest device on the website.

7. The method of claim 1, wherein aggregating, at the computing device, contextual information from the guest-related data comprises applying a model to the guest-related data, the model being configured to predict customer behavioral risk indicators based on prior activities of the guest that are identified in the guest-related data.

8. The method of claim 1, further comprising:
- calculating, at the computing device, a safety risk score, wherein the safety risk score is inverse to the risk score; and
- generating, at the computing device, the recommendation action based on the risk score and the safety risk score.

9. The method of claim 1, wherein:
- aggregating, at the computing device, contextual information from the guest-related data comprises determining at least one of: (i) the guest accessed the website using a known and verified IP address, (ii) the guest is attempting to perform an action on the website that comprises visiting a low-risk webpage on the website without sensitive information, and (iii) the guest is a returning user of the website;
- calculating, at the computing device, a risk score comprises assigning a value to the risk score that is less than the first threshold score value based on determining at least one of (i)-(iii); and
- generating, at the computing device, a recommended action comprises removing at least a portion of the current authentication requirements on the website.

10. The method of claim 9, wherein the recommended action comprises prompting the guest, at the remote computing device, to provide, as user input, their login credentials without additional authentication requirements to interact with the website.

11. The method of claim 1, wherein:
- aggregating, at the computing device, contextual information from the guest-related data comprises determining at least one of: (i) the guest accessed the website using an unknown or unverified IP address, (ii) the guest is attempting to perform an action on the website that comprises visiting a webpage on the website with sensitive information, and (iii) the guest is a new user of the website;
- calculating, at the computing device, a risk score comprises assigning a value to the risk score that is greater than the first threshold score value based on determining at least one of (i)-(iii); and
- generating, at the computing device, a recommended action comprises requiring one or more additional authentication requirements in addition to the current authentication requirements on the website.

12. The method of claim 11, wherein the recommended action comprises prompting the guest, at the remote computing device, to provide, as user input, at least one of (i) biometric data, (ii) a pin to unlock a stored token corresponding to the guest, and (iii) a push OTP authentication request to interact with the website.

13. The method of claim 1, further comprising generating, at the computing device and based on the risk score exceeding a third threshold risk score value that is greater than the second threshold risk score, a recommended action to prevent access of the guest to sensitive information presented on one or more webpages of the website.

14. The method of claim 1, further comprising:
- generating, at the computing device, a range of recommended authentication actions that each are assigned to different risk score values between the first and second threshold risk score values;
- selecting, at the computing device, one of the recommended authentication actions that is assigned a risk score value that is the same as or within a threshold range of the calculated risk score of the guest; and
- transmitting, at the computing device, the selected recommended authentication action to the remote computing device to modify the content of the website according to the selected recommendation authentication action.

15. A system for assessing risks posed by a website guest, the system comprising:
- a data processing apparatus; and
- a memory device storing instructions that when executed by the data processing apparatus cause the server to perform operations comprising:
  - receiving a request for an internal reputation of a guest device interacting with a website;
  - collecting guest-related data from a plurality of different service engines wherein the plurality of different service engines includes a guest profile analysis engine, the guest profile analysis engine configured to perform operations comprising:
    identifying the guest device information about the guest device, wherein the guest device information includes three or more browser attributes, the browser attributes being selected from the group consisting of: browser type, version, installed fonts, OS, platform, version incrementing, cookies, do-not-track mode, internal storage, user agent, vendor, renderer, resolution, and time zone;
    retrieving historical device information about a plurality of devices having interacted with the website;
    comparing the guest device information with the historical device information;
    determining a matching between the guest device and any of the plurality of devices; and
    generating facts based on the comparison and the matching determination, the facts being part of the guest-related data;
aggregating contextual information from the guest-related data;
calculating a risk score based on the contextual information, the risk score representative of the internal reputation of the guest device;
comparing the risk score against a plurality of threshold risk score values to determine whether to modify current authentication requirements on the website for the guest, wherein the plurality of threshold risk score values comprise a first threshold risk score value and a second threshold risk score value, wherein the first threshold risk score value is less than the second threshold risk score value;
generating a recommended action with regard to the current authentication requirements based on the comparison between the risk score and the plurality of threshold risk score values, wherein the recommended action is selected from among (i) lowering the current authentication requirements on the website for the guest based on the risk score being less than the first threshold score value, (ii) elevating the current authentication requirements on the website for the guest based on the risk score exceeding the second threshold risk score value, and (iii) maintaining the current authentication requirements on the website for the guest based on the risk score being between the first and second threshold risk score values; and
transmitting the recommended action or the risk score to a remote computing device, the remote computing device configured to modify content of the website according to the risk score to lower, elevate, or maintain the current authentication requirements on the website for the guest.

16. The system of claim 15, wherein the plurality of different service engines includes a geolocation analysis engine, the geolocation analysis engine configured to perform operations comprising:
    identifying guest device information about the guest device, the guest device information including an IP address of the guest device;
    identifying historical device information about the guest device, the historical device information including a previous IP address of the guest device;
    determining a current location of the guest device based on the IP address;
    determining a previous location of the guest device based on the previous IP address; and
    calculating a travel speed of the guest device based on the current location and the previous location, the travel speed being part of the guest-related data.

17. The system of claim 15, wherein the plurality of different service engines includes an external IP analysis engine, the external IP analysis engine configured to perform operations comprising:
    identifying guest device information about the guest device, the guest device information including an IP address of the guest device;
    determining one or more masking schemes of the IP address; and
    calculating a score based on the masking schemes, the score being part of the guest-related data.

18. The system of claim 15, wherein the plurality of different service engines includes an external data collection engine, the external data collection engine configured to perform operations comprising:
    detecting a pattern of an interaction by the guest device with the website using a model that is configured to detect patterns of guest activity over past periods of time; and
    calculating a threat score based on the pattern, the threat score being part of the guest-related data.

* * * * *